United States Patent [19]
Handke et al.

[11] Patent Number: 5,622,242
[45] Date of Patent: Apr. 22, 1997

[54] SHOCK ABSORBER, AND SHOCK ABSORBER, SUCH AS A MACPHERSON STRUT, WITH DECOMPRESSION STOP LIMIT BRACKET

[75] Inventors: Günther Handke, Euerbach; Andreas Zietsch, Röthlein, both of Germany

[73] Assignee: Fichtel & Sachs AG, Schweinfurt, Germany

[21] Appl. No.: 263,773

[22] Filed: Jun. 22, 1994

[30] Foreign Application Priority Data

Jun. 24, 1993 [DE] Germany .......................... 43 21 036.8

[51] Int. Cl.⁶ ................................................. B60G 15/00
[52] U.S. Cl. ........................... 188/322.11; 280/96.1
[58] Field of Search ...................... 188/322.11, 322.12;
280/96.1, 661, 668, 696, 701; 248/230;
228/144; 72/379.2

[56] References Cited

U.S. PATENT DOCUMENTS

| | | | |
|---|---|---|---|
| 4,261,446 | 4/1981 | Bolger | 188/322.11 |
| 4,363,436 | 12/1982 | Evans et al. | |
| 5,228,717 | 7/1993 | Perkins | 280/668 |
| 5,277,357 | 1/1994 | Miyamoto et al. | 72/379.2 |
| 5,308,032 | 5/1994 | Ohta | 280/668 |
| 5,350,044 | 9/1994 | Gelhausen | 188/322.12 |
| 5,401,051 | 3/1995 | Ivory | 280/668 |
| 5,423,403 | 6/1995 | Handke et al. | 280/668 |

FOREIGN PATENT DOCUMENTS

| | | |
|---|---|---|
| 0029289 | 5/1981 | European Pat. Off. . |
| 0497857 | 8/1992 | European Pat. Off. . |
| 2299982 | 3/1976 | France . |
| 8506529 | 6/1985 | Germany . |
| 2279598 | 1/1995 | United Kingdom .................. 228/144 |
| 9106438 | 5/1991 | WIPO . |

*Primary Examiner*—Robert Oberleitner
*Assistant Examiner*—Chris Schwartz
*Attorney, Agent, or Firm*—Nils H. Ljungman and Associates

[57] ABSTRACT

A Shock absorber, in particular a MacPherson strut unit, with a decompression stop limit bracket which is fastened to a container tube and which, in the event of a rebound of a vehicle axle, comes into contact with a body-side support surface, comprising a base plate with side walls which is welded to a reinforcement plate and a radial guide plate which is connected to the container tube, characterized by the fact that the side walls and the guide plate as well as the reinforcement plate form a groove which is filled by a weld seam such that all the parts forming the groove are connected to one another by means of the weld seam.

24 Claims, 18 Drawing Sheets

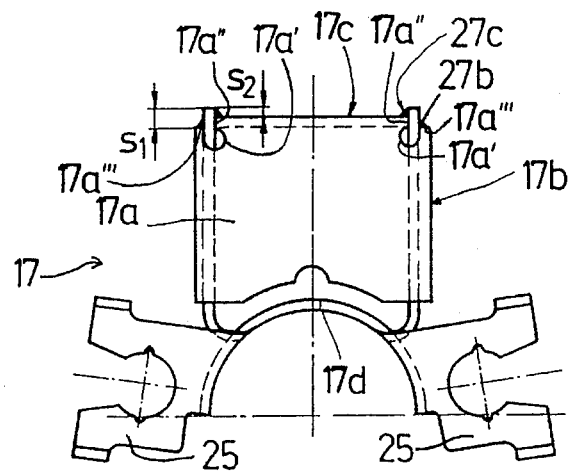
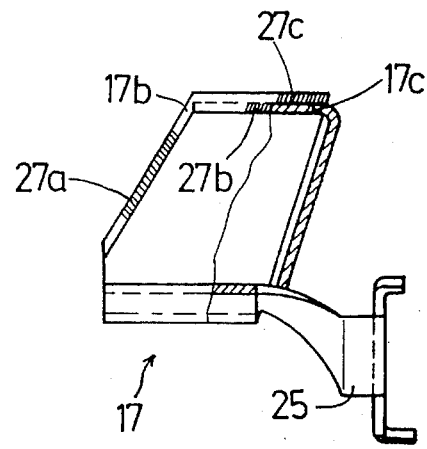
FIG. 3d  FIG. 3e
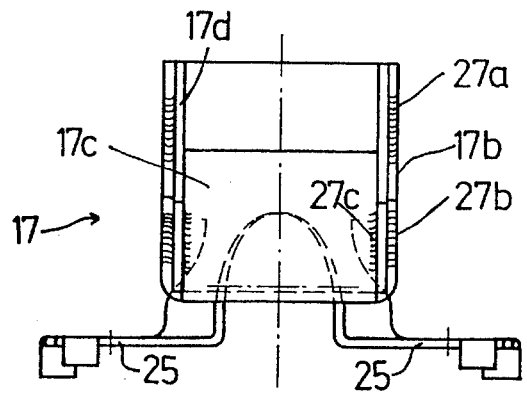
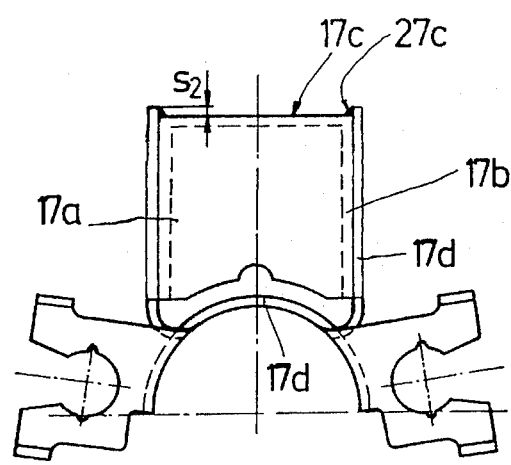
FIG. 3f  FIG. 3g

SHOCK ABSORBER, AND SHOCK ABSORBER, SUCH AS A MACPHERSON STRUT, WITH DECOMPRESSION STOP LIMIT BRACKET

BACKGROUND OF THE INVENTION

1. Field of the Invention

The present invention generally relates to a shock absorber, in particular a MacPherson strut unit with a decompression stop limit bracket which is fastened to a container tube and which, in the event of a rebound of a vehicle axle, comes into contact with a body-side support surface. Such a decompression stop can generally have a base plate with side walls, which can be welded to a reinforcement plate and a radial guide plate which is for being connected to the container tube.

2. Background Information

International Patent Application No. 91/06 438 discloses a MacPherson strut unit which has, on its container tube, a decompression stop limit bracket which comes into contact with a support surface on the body side, when the vehicle axle has reached its maximum rebound position. The decompression stop limit bracket essentially includes a base plate and a reinforcement plate, as well as a radial guide plate, whereby the base plate is welded to the reinforcement plate and to the guide plate. It appears to have been suggested to use a spot welding process for the weld between the base plate and the guide plate, and to use an inert gas shielded arc welding process for the weld between the reinforcement plate and the base plate.

OBJECT OF THE INVENTION

The object of the present invention is to achieve a reduction in the cost of the decompression stop component, while maintaining or increasing the load limit of the decompression stop limit bracket.

SUMMARY OF THE INVENTION

The present invention teaches that the above object can be achieved if, in at least one embodiment of the present invention, the side walls and the guide plate, as well as the reinforcement plate, form a groove which is filled by a weld seam, so that all the parts forming the groove are connected to one another by means of the weld seam.

As a result of the threefold connection accomplished by the weld seam, the spot weld between the base plate and the guide plate is essentially no longer necessary. If necessary, there can be a weld seam between the base plate and the guide plate. As a result of the uniform welding method, the combination of weld seams is significantly cheaper than the welding method of the prior art.

The invention also teaches that the reinforcement plate, on its ends, can advantageously come into contact with the guide plate by means of tabs. The groove for the weld seam can thus be made wider, which would essentially guarantee that all the parts of the decompression stop limit bracket are essentially captured by the weld seam.

In one embodiment, the base plate and the reinforcement plate can preferably form a single component which is welded to the guide plate. The time, effort and expense of welding can be advantageously reduced, along with the time, effort and expense required for assembly, since there would thus essentially no longer be any need to insert the reinforcement plate.

According to one advantageous feature, the component constituted by the base plate and the reinforcement plate can optionally be applied to the guide plate internally or externally. If the load bearing capacity of the decompression stop limit bracket is of primary importance, the component can preferably be applied outside the guide plate. In very tight spaces, it can be appropriate to place the component inside the guide plate.

An additional advantageous feature, according to at least one embodiment of the invention, may be found in that the component can preferably have an edge distance from the guide plate which is wide enough for a fillet weld to be laid down between the component and the guide plate.

The fastest, easiest and cheapest weld can essentially be achieved by forming the entire decompression stop limit bracket from a single bent component. The number of parts can therefore be limited to the minimum.

To reduce the set-up times for the welding jig, the weld seams which close the bent component can preferably essentially lie in one plane. Either the welding apparatus or the jig holding the decompression stop limit bracket can thus preferably be tipped, and the correct starting position for the next weld seam lying in the plane can thus essentially preferably be set immediately.

As disclosed herebelow, a brake hose bracket can preferably be designed as one piece with the decompression stop. On account of this advantageous feature, the brake hose bracket does not essentially require its own welded connection to the container tube. Positioning problems can thereby essentially be solved.

In accordance with an additional advantageous feature, the weld seams are within the axis of symmetry of the decompression stop limit bracket. In connection with a brake hose holder, this achieves the advantage that the distance between the brake hose holder and the decompression stop limit bracket can be kept particularly small.

In known arrangements, a weld is made by means of the end surface of the side walls to the container tube. To reduce the bending moment which acts on the decompression stop limit bracket, the guide plate is welded to the container tube. The distance between the end surface and the guide plate represents the reduction achieved in the bending moment.

In summary, one aspect of the invention resides broadly in a vibration damper, such as a MacPherson strut, comprising: a first end and a second end; an outer tube disposed between the first end and the second end; the first end comprising means for connecting the vibration damper to a first body; the second end comprising means for connecting the vibration damper to a second body; the outer tube having an external surface; the outer tube defining a circumference at the external surface; a chamber defined within the outer tube; the chamber containing a damping fluid; a piston rod sealingly projecting into the chamber and being axially displaceable with respect to the outer tube; a piston attached to the piston rod, the piston being disposed within the chamber to sealingly divide the chamber into first and second chambers; means for permitting fluid communication between the first and second chambers; the vibration damper defining a central longitudinal axis, the central longitudinal axis defining an axial direction of the vibration damper; bracket means extending outwardly from the outer tube in a generally radial direction with respect to the longitudinal axis; the bracket means having means for limiting axial displacement of at least a portion of the vibration damper; the means for limiting axial displacement comprising means for striking an external object to cease axial displacement of the at least a portion of the vibration damper; the bracket means comprising: a back portion disposed adjacent the external surface of the outer tube, the back portion extending over a portion of the circumference of the outer tube; a pair of side portions extending radially outwardly from the external surface of the outer tube each of the pair of side portions being spaced apart from one another, portion extending between the pair of side portions, the front portion being spaced apart from the back portion; a single weld for simultaneously and operatively connecting a portion of the front portion with: the back portion; and at least one of the side portions.

Another aspect of the invention resides broadly in a method of making a vibration damper, such as a MacPherson strut, vibration damper comprising: a first end and a second end; an outer tube disposed between the first end and the second end; the first end comprising means for connecting the vibration damper to a first body; the second end comprising means for connecting the vibration damper to a second body; the outer tube having an external surface; the outer tube defining a circumference at the external surface; a chamber defined within the outer tube; the chamber containing a damping fluid; a piston rod sealingly projecting into the chamber and being axially displaceable with respect to the outer tube; a piston attached to the piston rod, the piston being disposed within the chamber to sealingly divide the chamber into first and second chambers; means for permitting fluid communication between the first and second chambers; the vibration damper defining a central longitudinal axis, the central longitudinal axis defining an axial direction of the vibration damper; the method comprising the steps of: configuring the vibration damper to comprise a first end and a second end; providing an outer tube and disposing the outer tube between the first end and the second end; configuring the first end to comprise means for connecting the vibration damper to a first body; configuring the second end to comprise means for connecting the vibration damper to a second body; configuring the outer tube to have an external surfacer the outer tube defining a circumference at the external surface; defining a chamber within the outer tube; disposing a damping fluid in the chamber; providing a piston rod and sealingly projecting the piston rod into the chamber; configuring the piston rod to be being axially displaceable with respect to the outer tube; providing a piston and attaching the piston to the piston rod; disposing the piston within the chamber to sealingly divide the chamber into first and second chambers; providing means for permitting fluid communication between the first and second chambers; configuring the vibration damper to define a central longitudinal axis, the central longitudinal axis defining an axial direction of the vibration damper; providing bracket means, and mounting the bracket means to extend outwardly from the outer tube in a generally radial direction with respect to the longitudinal axis; configuring the bracket means to have means for limiting axial displacement of at least a portion of the vibration damper, the means for limiting axial displacement comprising means for striking an external object to cease axial displacement of the at least a portion of the vibration damper; the step of providing bracket means comprising the steps of providing a back portion and disposing the back portion adjacent the external surface of the outer tube, the back portion extending over a portion of the circumference of the outer tube; providing a pair of side portions and disposing the pair of side portions to extend radially outwardly from the external surface of the outer tube; disposing the pair of side portions such that each of the pair of side portions is spaced apart from one another; providing a front portion and disposing the front portion to extend between the pair of side portions, the front portion being spaced apart from the back portion; providing a single weld for simultaneously and operatively connecting a portion of the front portion with: the back portion; and at least one of the side portions; and simultaneously and operatively connecting the portion of the front portion with: the back portion; and at least one of the side portions; with the single weld.

BRIEF DESCRIPTION OF THE INVENTION

The invention is explained in greater detail below with reference to the accompanying drawings, in which:

FIGS. 3d–3f represent substantially the same views as FIGS. 3a–3c, respectively, but are more detailed;

FIG. 3g is essentially the same view as FIGS. 3a and 3d but represents an alternative embodiment;

Figure 4A:
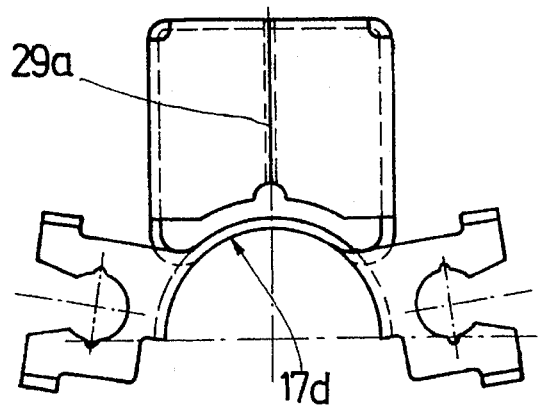
Figure 4B:
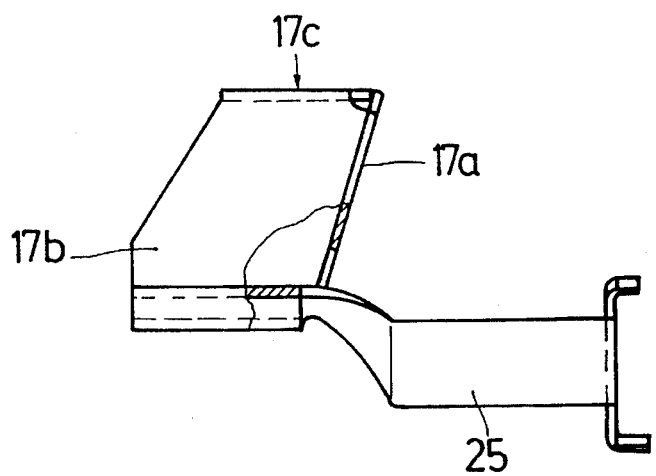
Figure 4C:
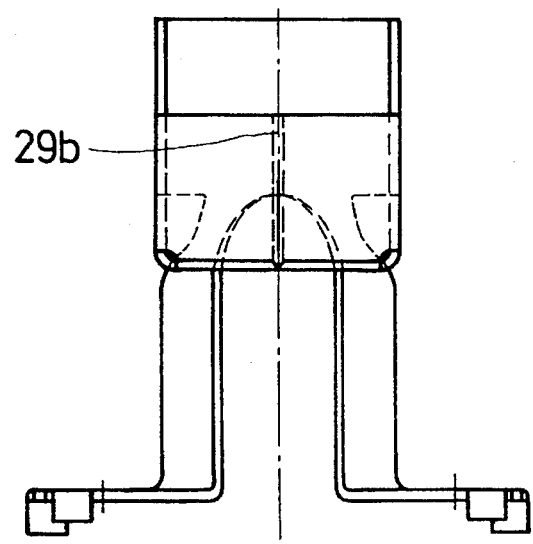
Figure 4D:
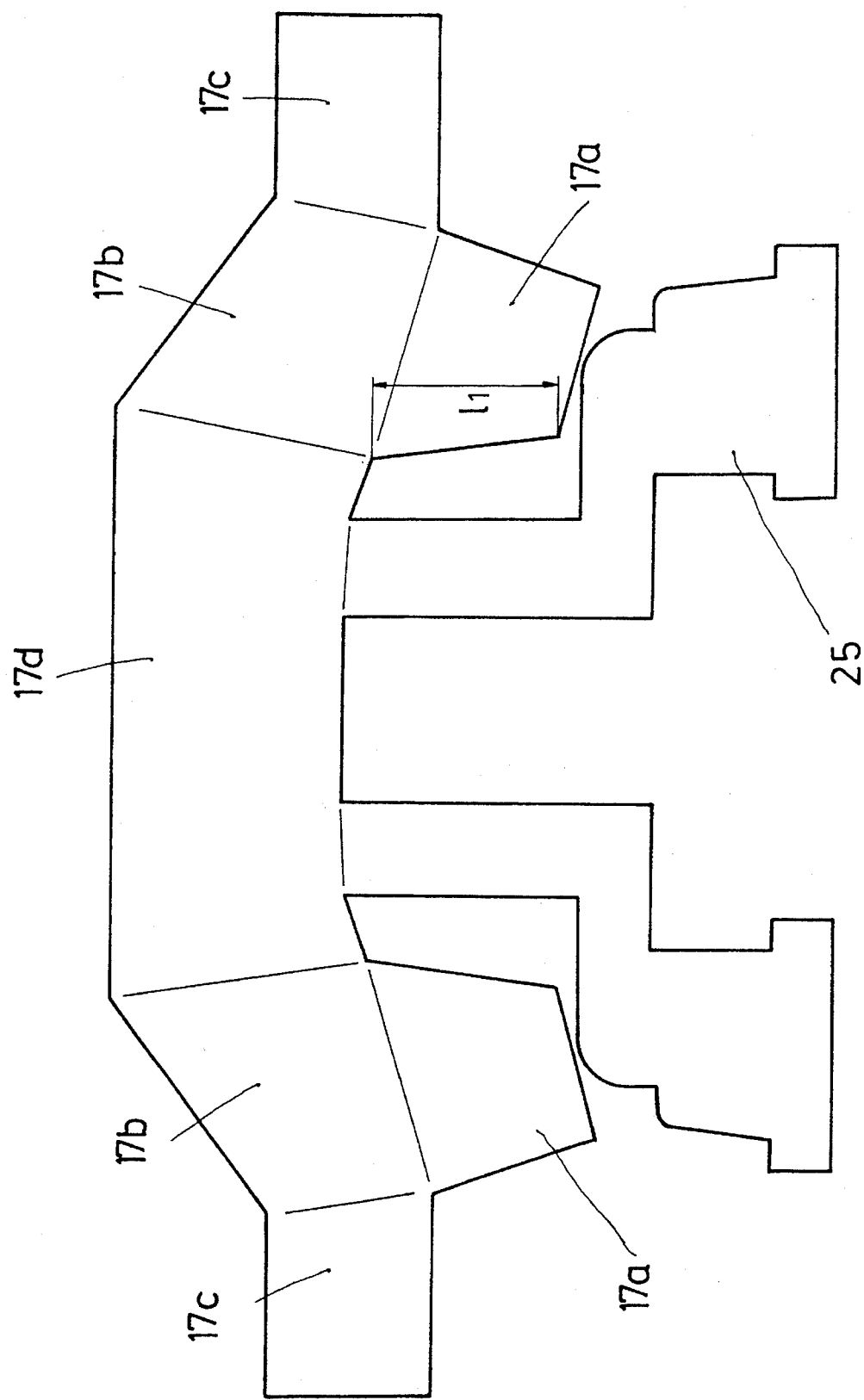
Figure 4E:
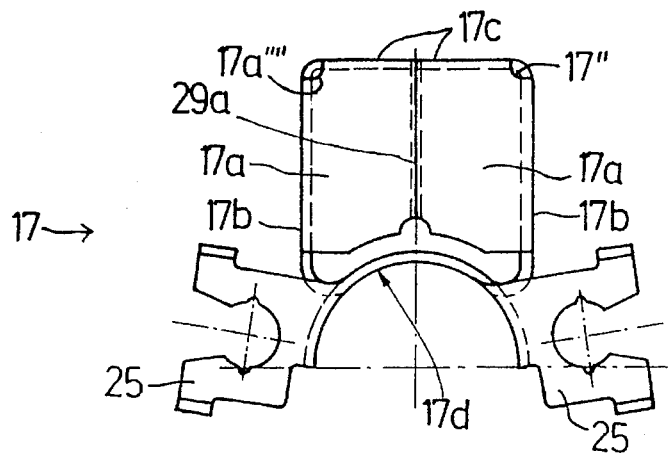
Figure 4F:
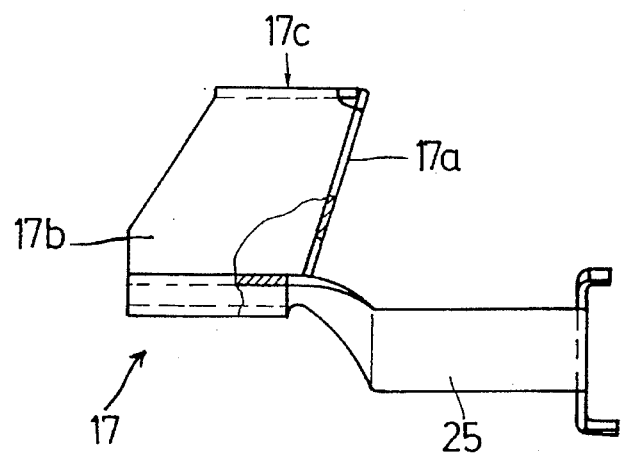
Figure 4G:
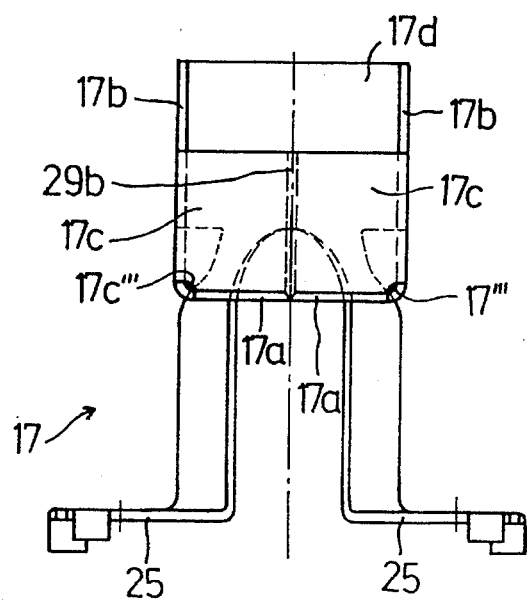
Figure 5:
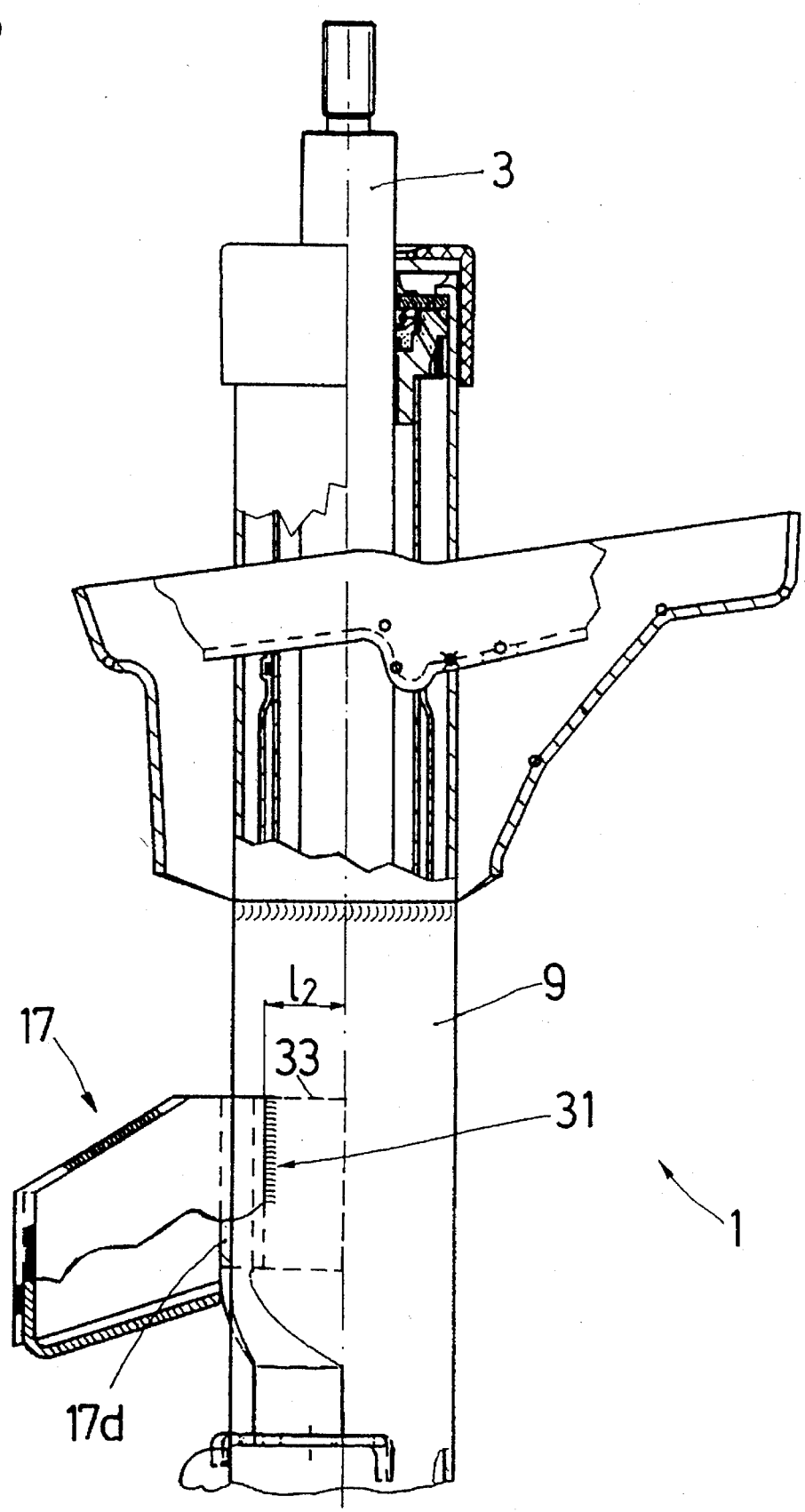
Figure 6A:
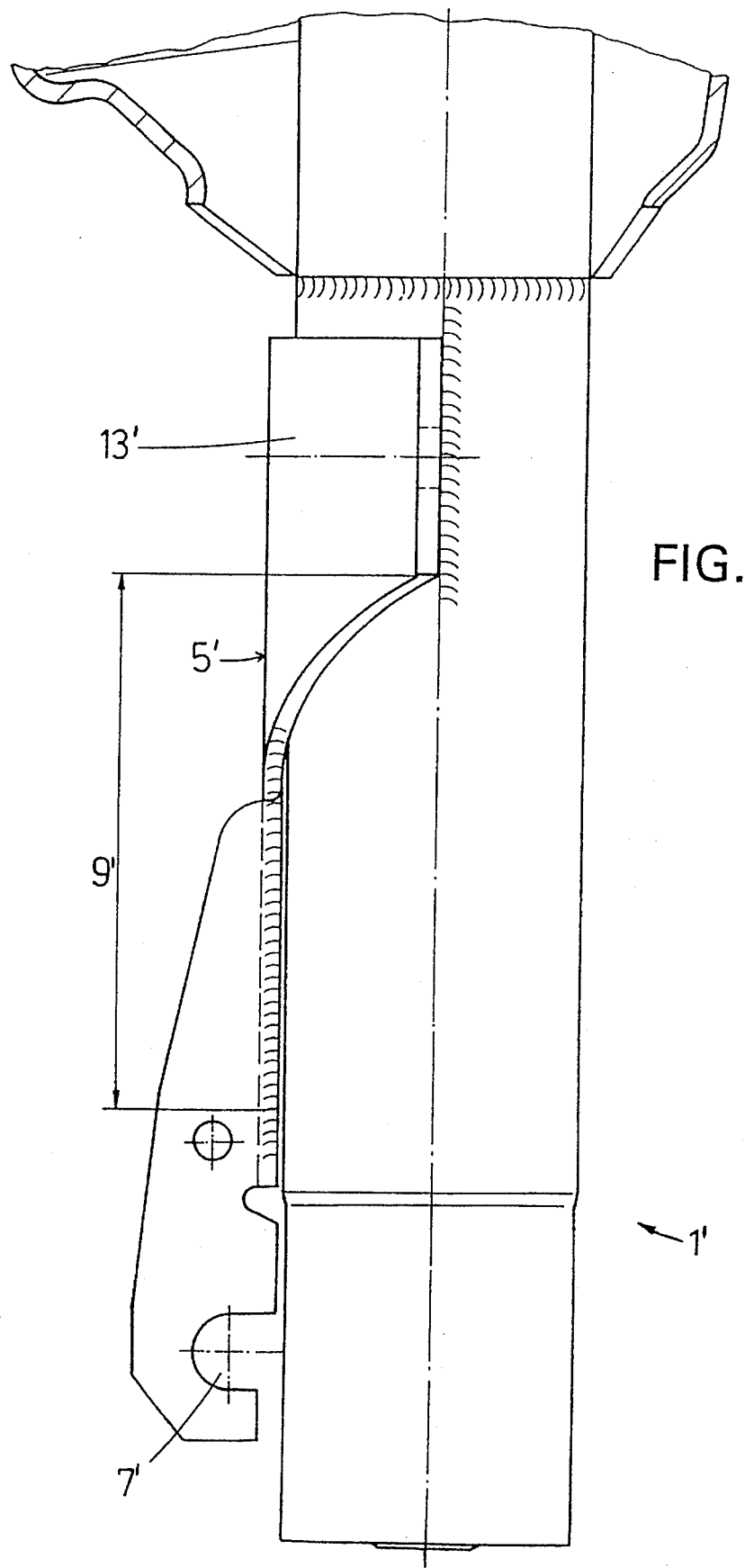
Figure 6B:
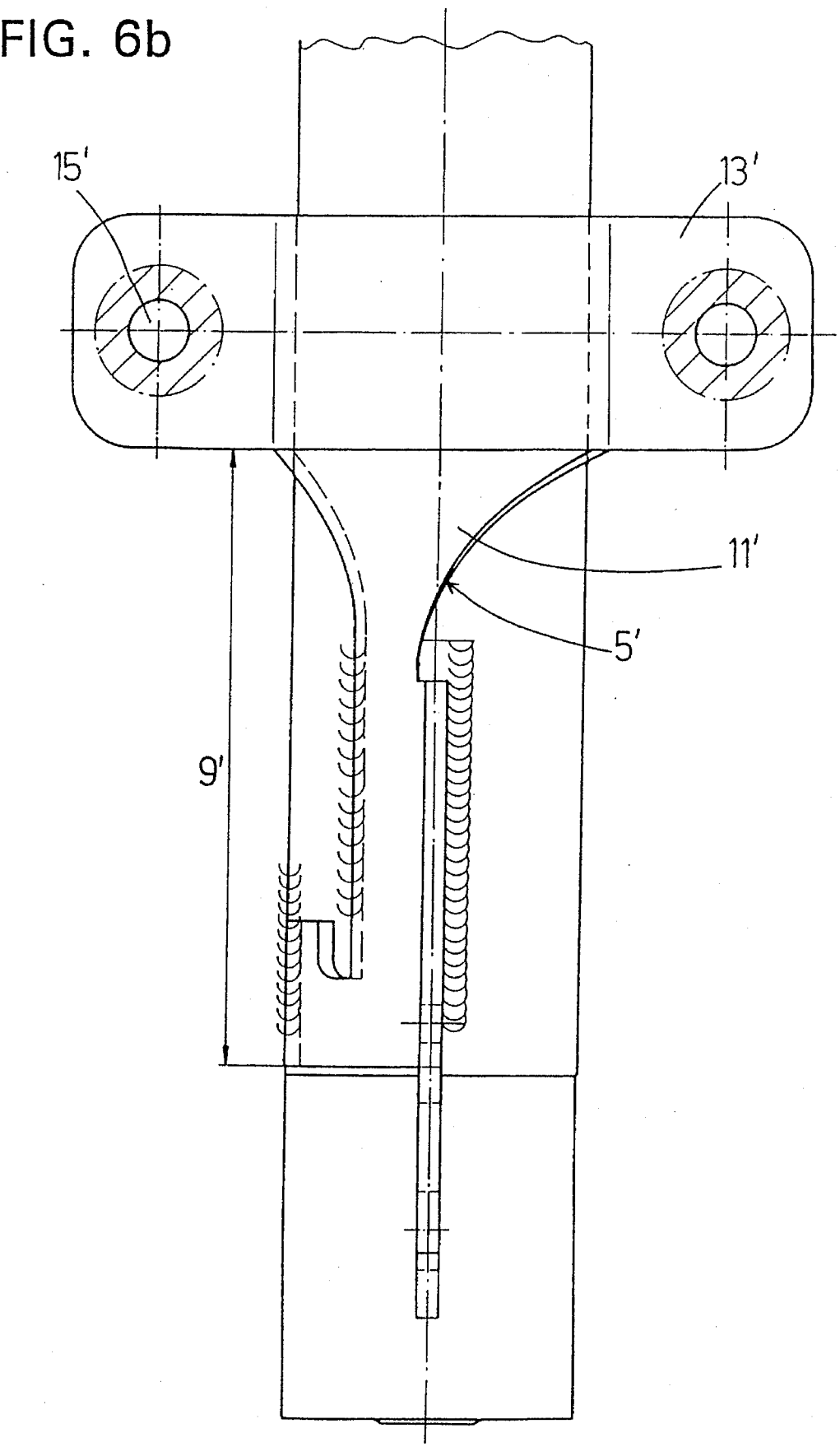
Figure 7C:
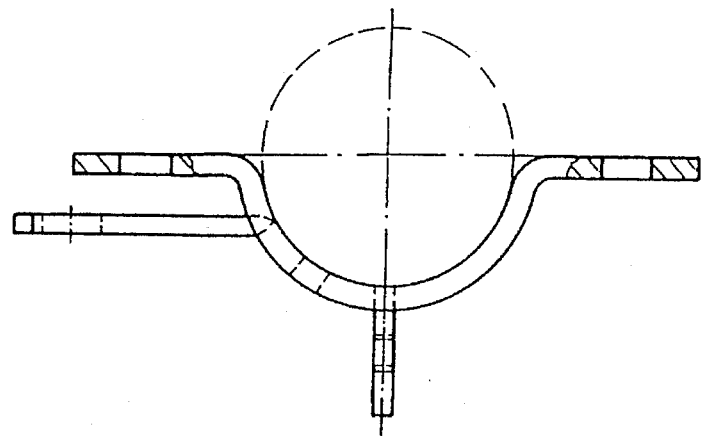
Figure 7A:
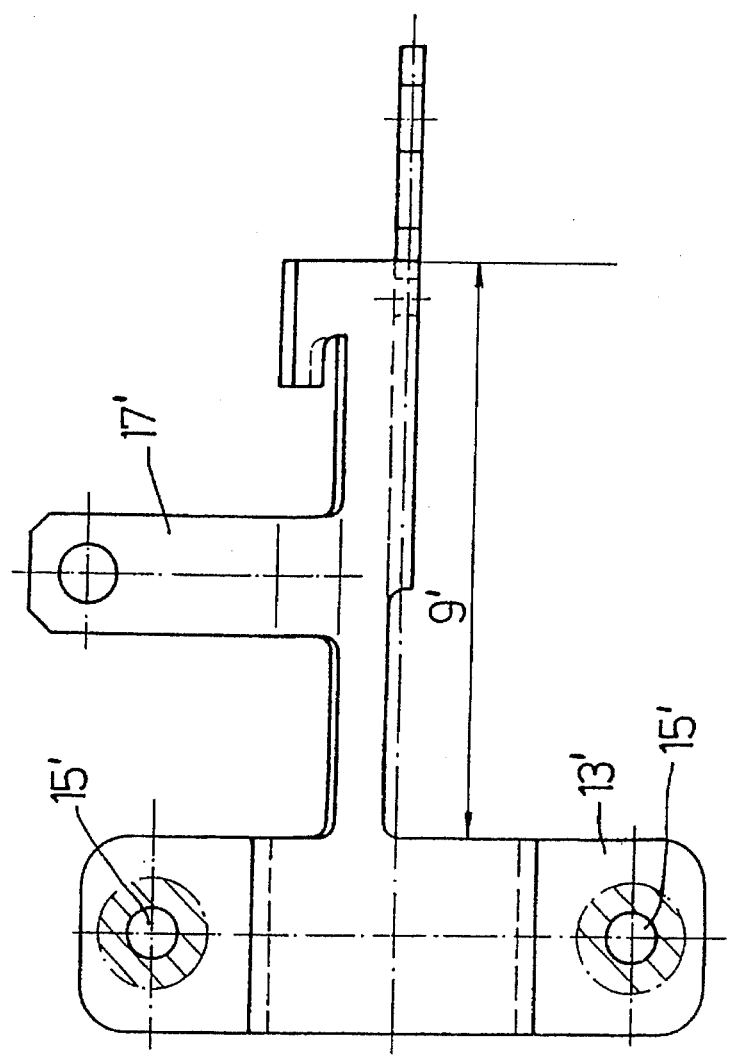
Figure 7B:
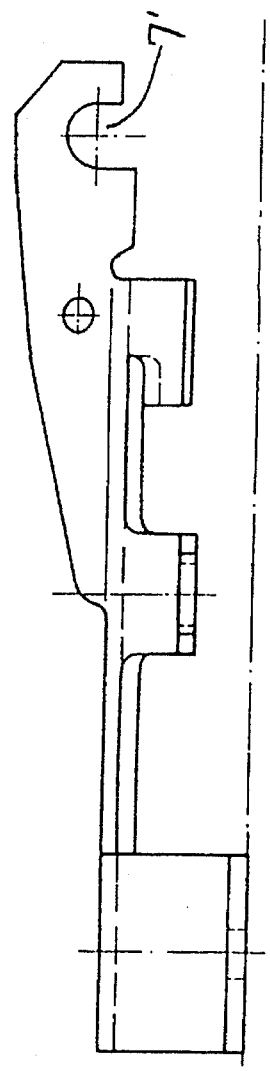
Figure 9A:
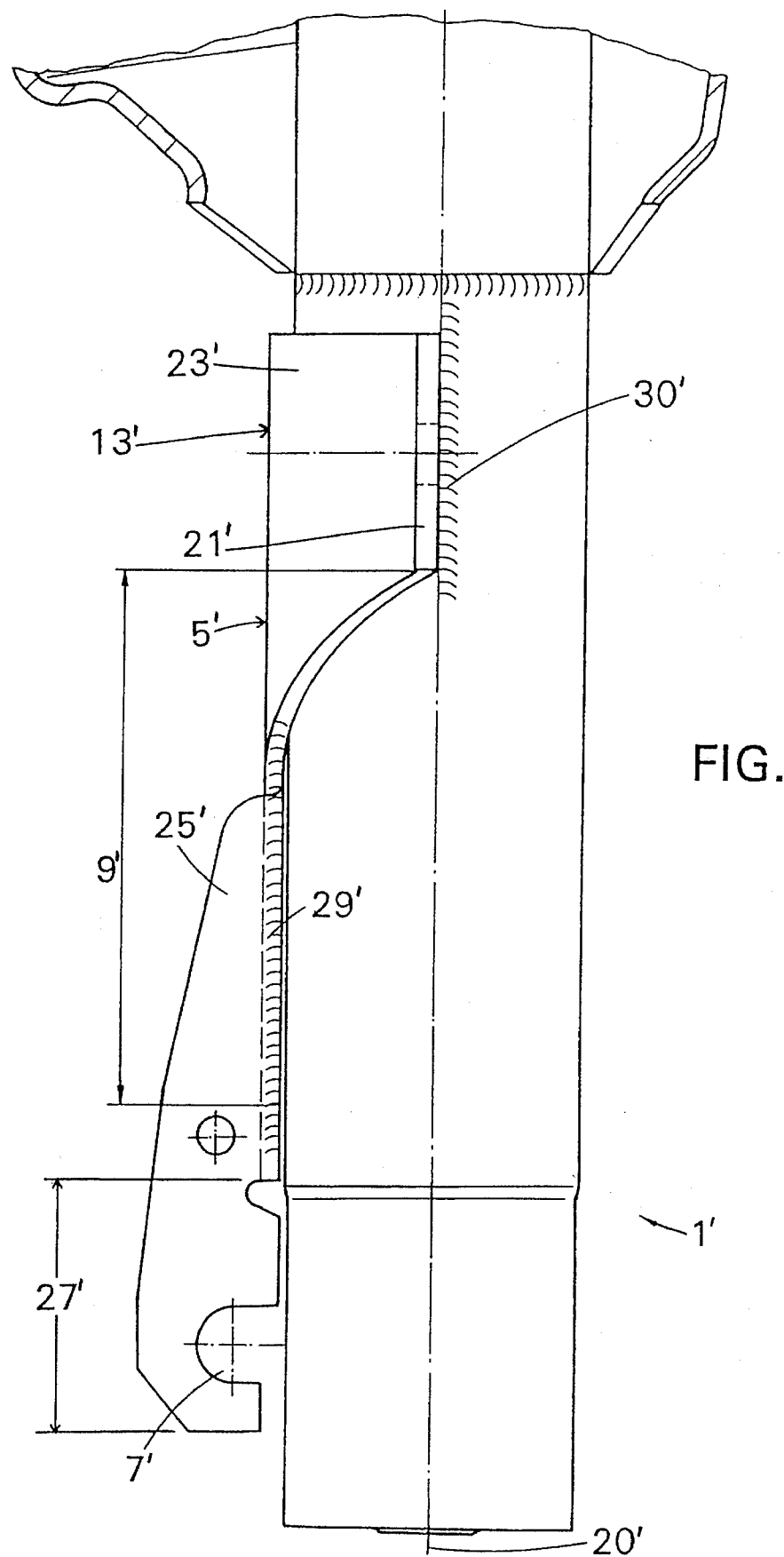
Figure 9B:
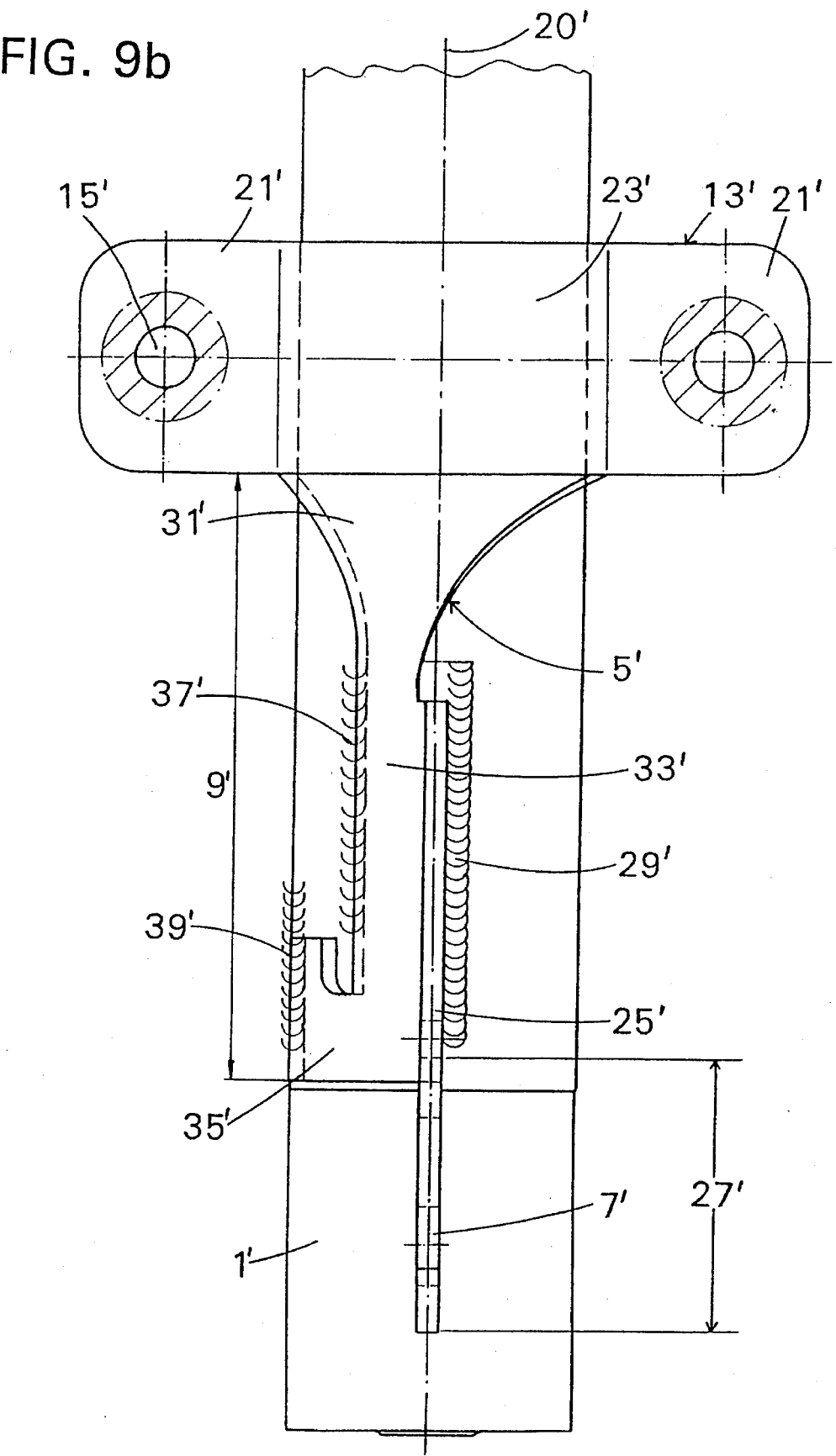
Figure 10C:
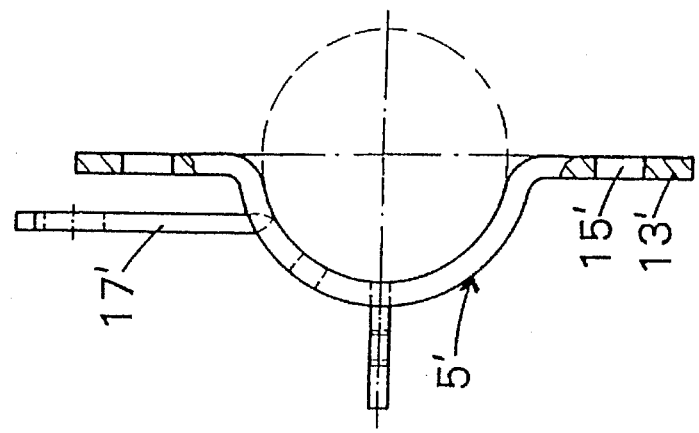
Figure 10A:
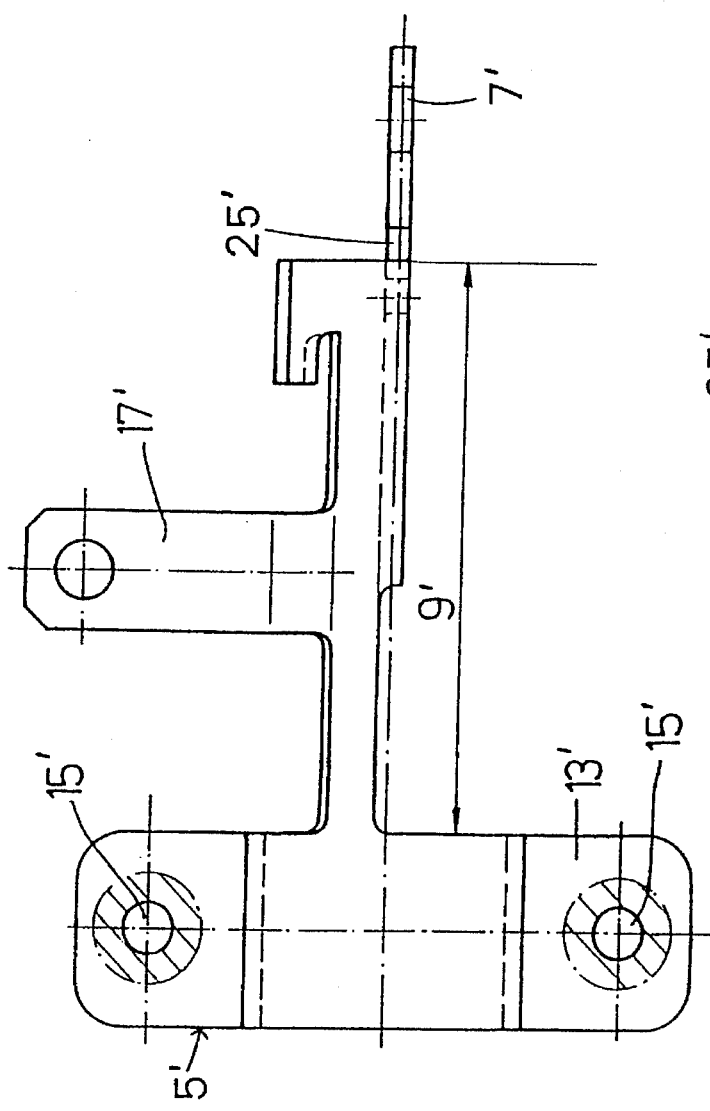
Figure 10B:
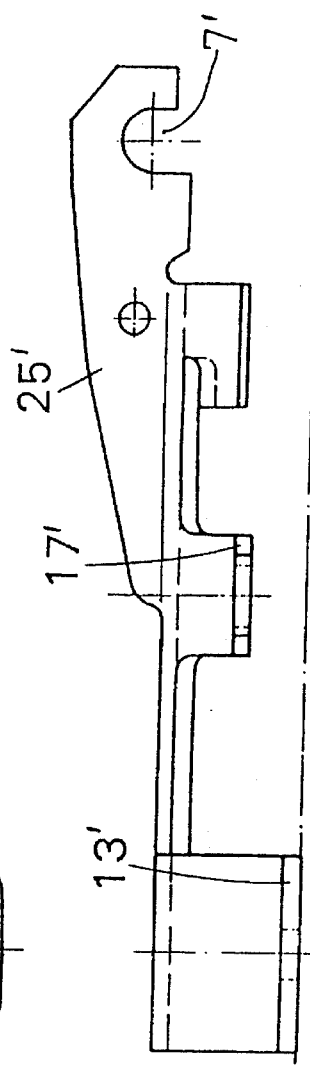
Figure 11A:
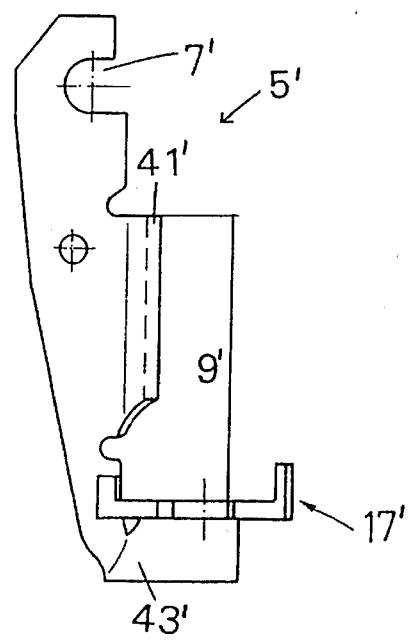
Figure 11D:
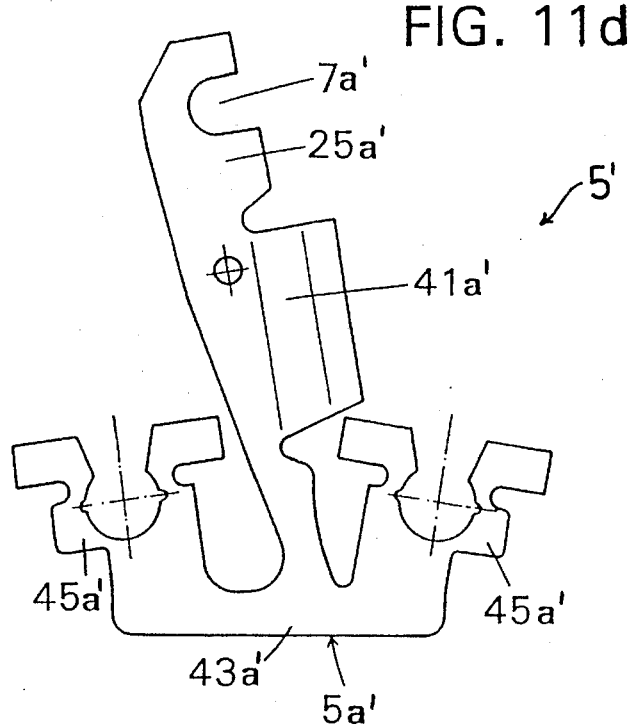
Figure 11B:
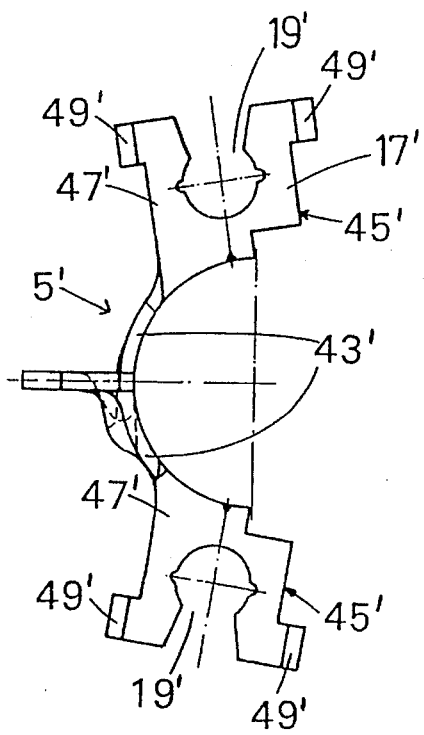
Figure 11C:
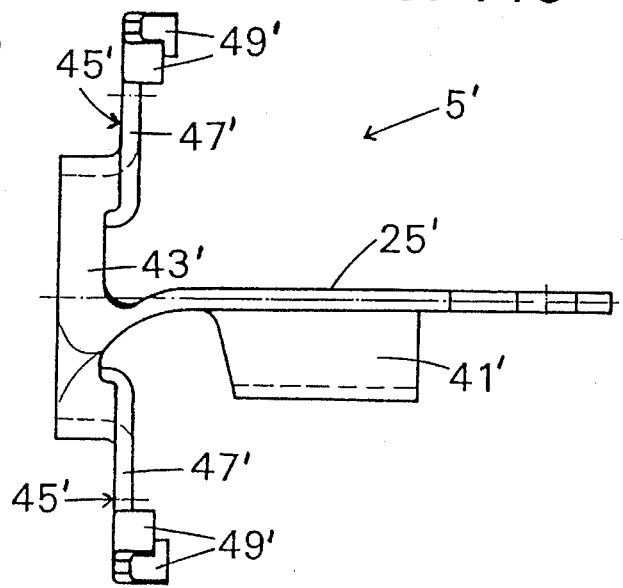
Figure 12:
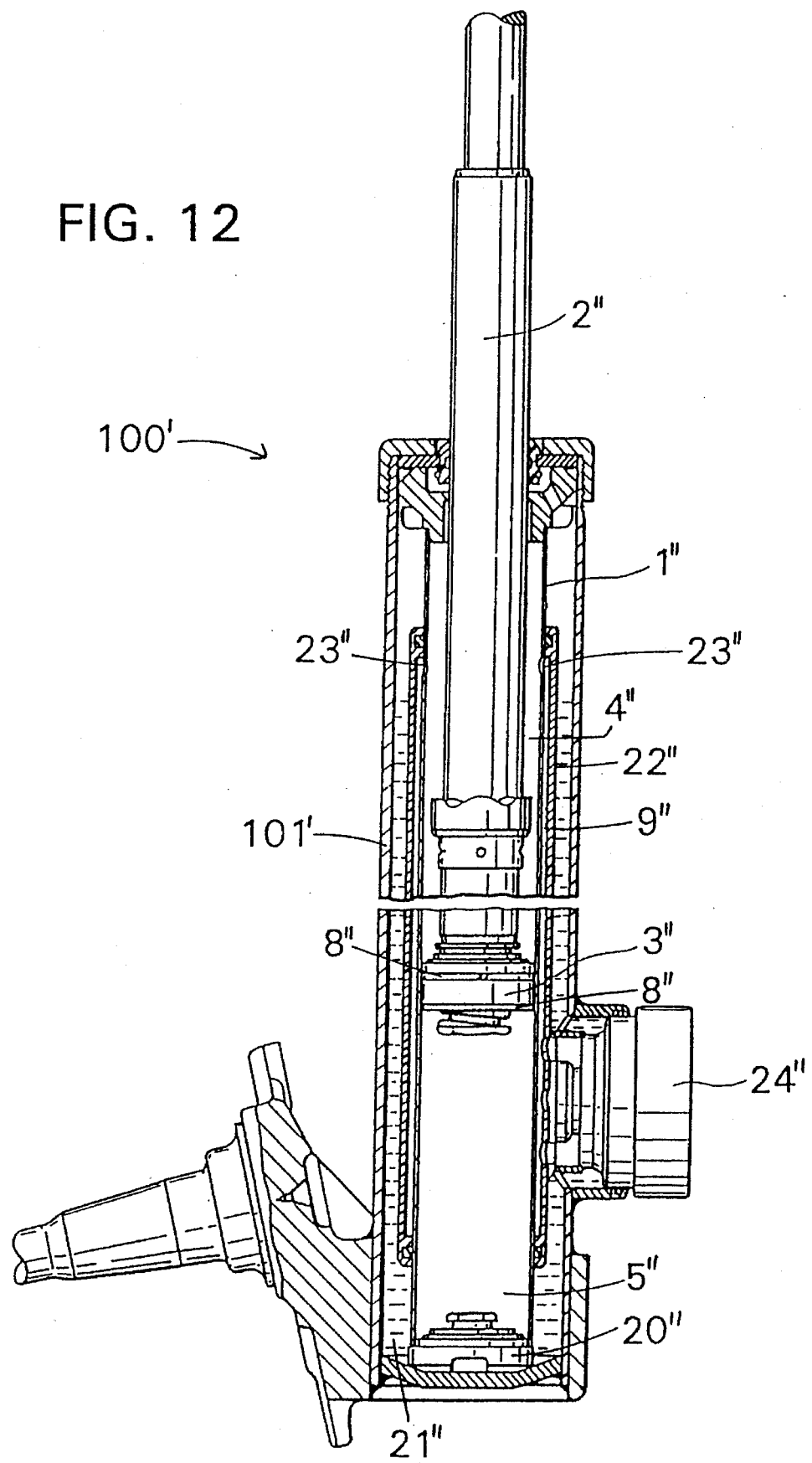

FIGS. 4a–4d illustrate a one-piece decompression stop limit bracket wherein FIG. 4a is a bottom view of a formed bracket, FIG. 4b is substantially the same view as FIG. 4a but rotated about 90° in vertical plane, FIG. 4c is a frontal view of the formed bracket illustrated in FIGS. 4a and 4b, and FIG. 4d represents an "unbent" version of the bracket illustrated in FIGS. 4a and 4c ;

FIGS. 4e–4g represent substantially the same views as FIGS. 4a–4c, respectively, but are more detailed; and FIG. 5 is a shock absorber with a decompression stop limit bracket; and FIGS. 6a–12 illustrate a fastening device and associated shock absorber having components, and encompassing methods, which may be utilized in accordance with the embodiments of the present invention, wherein:

FIGS. 6a–6b illustrate a shock absorber outer tube with a fastening device;

FIGS. 7a–7c illustrate the fastening device separately;

FIGS. 8a–8d also illustrate the fastening device separately;

FIGS. 9a–9b are, respectively, substantially the same views as FIGS. 6a–6b, but illustrate additional components;

FIGS. 10a–10c are, respectively, substantially the same views as FIGS. 7a–7c, but illustrate additional components;

FIGS. 11a–11d are, respectively, substantially the same views as FIGS. 8a–8d, but illustrate additional components; and FIG. 12 illustrates a shock absorber which may be utilized in accordance with the embodiments of the present invention.

DESCRIPTION OF THE PREFERRED EMBODIMENTS

Figure 1:
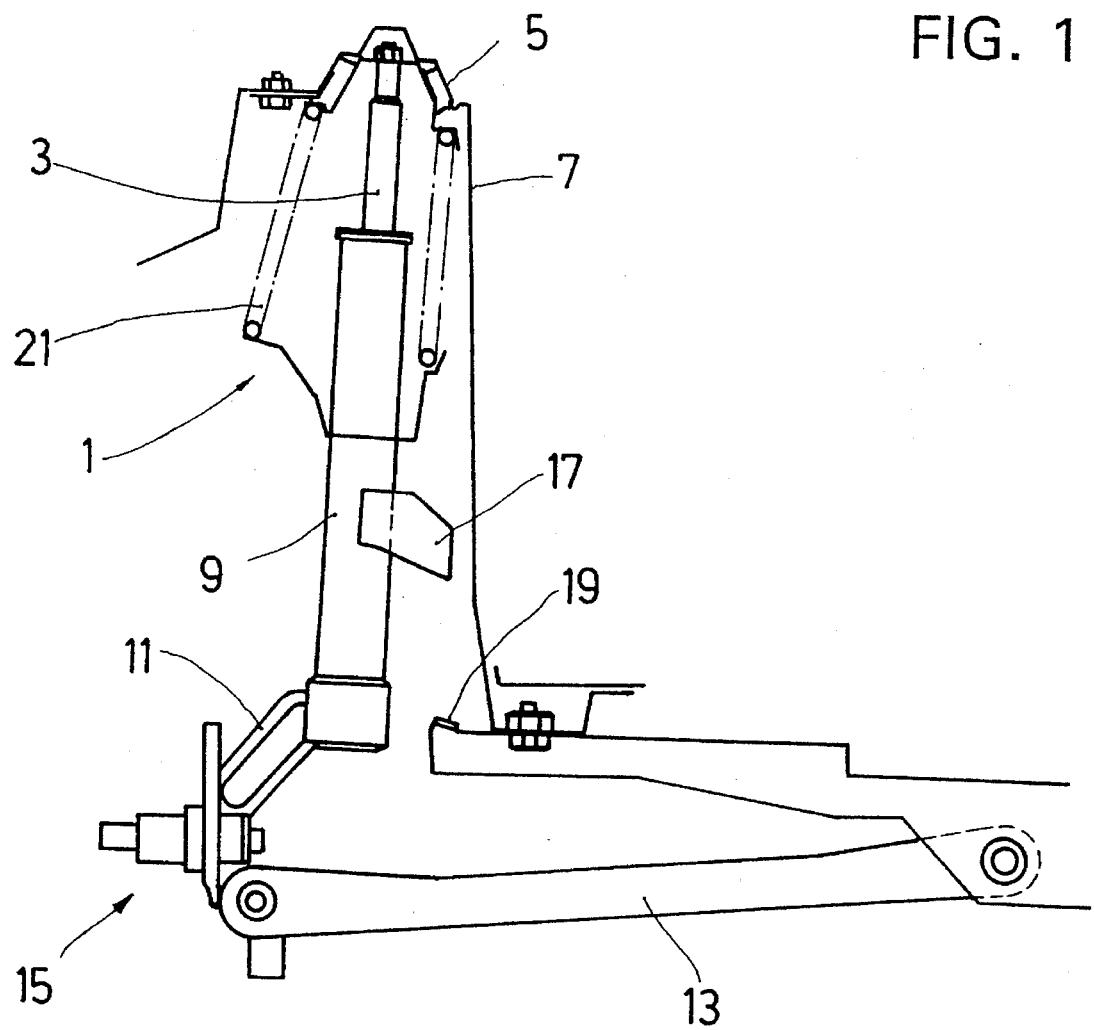
FIG. 1 is an illustration of a shock absorber installation.

FIG. 1 illustrates a known shock absorber installation. A shock absorber 1, which in this case could possibly be a MacPherson strut, can preferably be connected by means of a piston rod 3 to a support bearing 5 of a vehicle body 7. A container tube 9 has a wheel suspension 11, which, in turn, can preferably be connected to a suspension arm 13 as a component of a vehicle axle 15.

As shown, the container tube can also preferably have a decompression stop limit bracket 17 which can preferably come into contact with a support surface 19 on the body side, when the vehicle axle 15 reaches its maximum rebound position, e.g. when the vehicle is jacked up. In this rebound position of the vehicle axle 15, greater bending moments resulting from the weight of the vehicle axle 15 and the additional spring force of a vehicle suspension spring 21 are essentially applied at the connection between the container tube 9 and the decompression stop limit bracket 17.

The illustration in FIGS. 2a to 2d essentially can be considered to be restricted to the decompression stop limit bracket 17. The decompression stop limit bracket 17 preferably includes a base plate 17a and adjacent side walls 17b. A reinforcement plate 17c and a guide plate 17d are also preferably welded to the base plate 17a and the side walls 17c respectively.

Figure 2A:
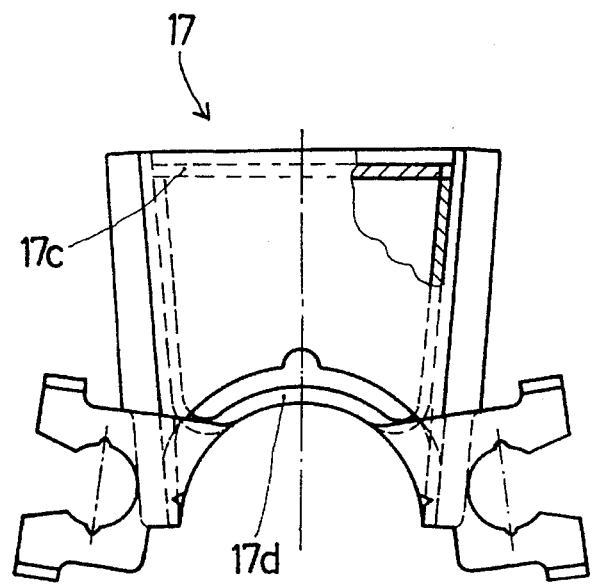
FIGS. 2a–2d illustrate a three-piece decompression stop limit bracket.
Figure 2B:
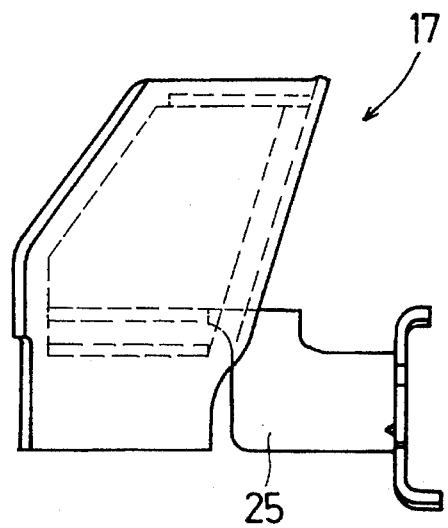
Figure 2C:
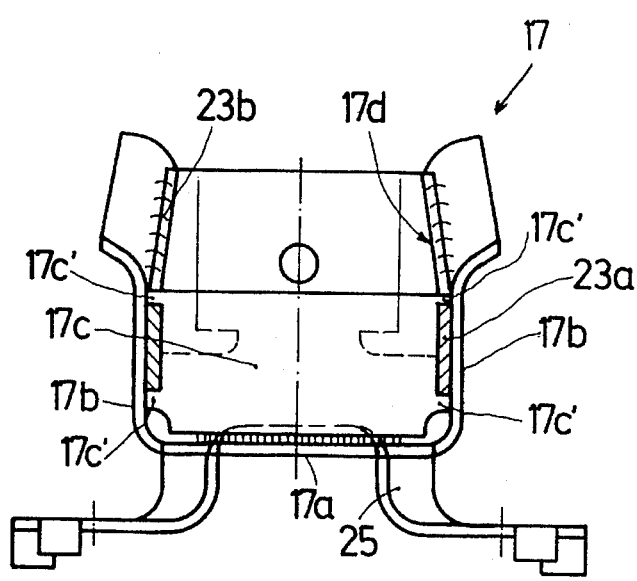
Figure 2D:
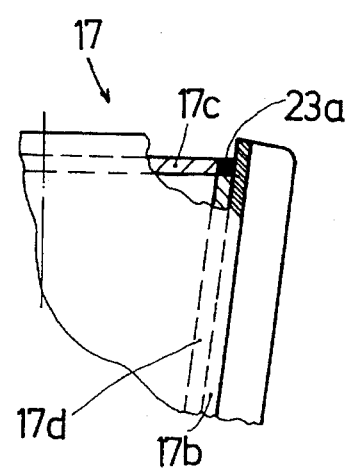
Figure 2E:
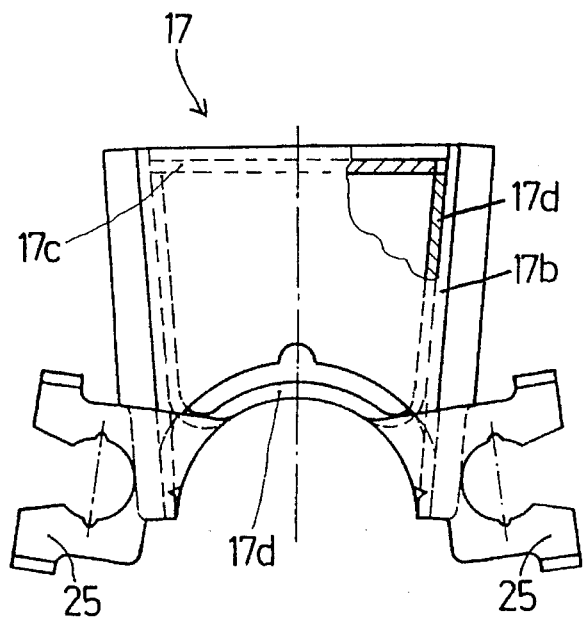
FIGS. 2e–2h represent substantially the same views as FIGS. 2a–2d, respectively, but are more detailed.
Figure 2F:
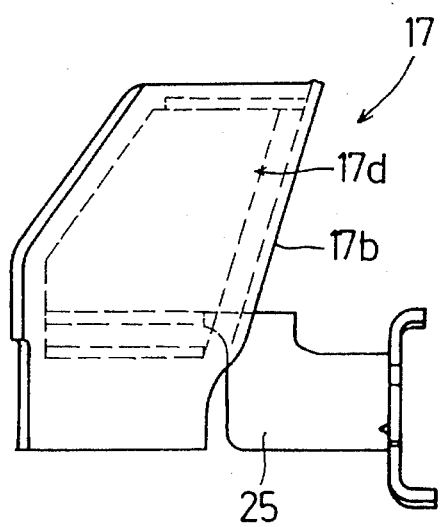

FIG. 2d shows that the base plate 17a, with its side walls 17b, the reinforcement plate 17c and the guide plate 17d, form a groove, which is preferably used to hold a weld seam 23a. As a result of the chamber formed by the three individual parts of the decompression stop limit bracket 17, all the parts can preferably be connected by means of a weld seam 23a, so that the assembly has an advantage, in terms of strength, over similar known assemblies. The reinforcement plate 17c preferably has tabs 17c' on its ends which are manufactured by a notching process, and which are in contact with the guide plate 17d. The width of the groove can thereby be increased, which guarantees that all the parts can be captured by the weld seam 23a. The weld joint between the guide plate 17d and the side walls 17b is preferably a weld seam 23b. The two weld seams 23a and 23b lie in a plane, so that both weld seams 23a and 23b can be fabricated in one welding jig by slightly tipping the decompression stop limit bracket 17.

In the embodiment illustrated in FIGS. 2a–2d, a brake hose bracket 25 can preferably be designed as one piece with the base plate 17a. There is essentially no need for an additional weld seam for the brake hose bracket, or for the related positioning measures by means of the welding jig.

FIGS. 2e through 2h represent essentially the same views as FIGS. 2a–2d, respectively, but are more detailed.

Figure 2G:
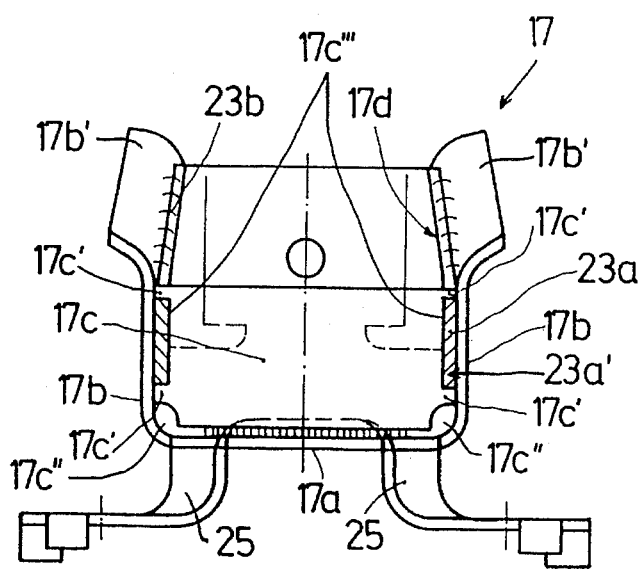
Figure 2H:
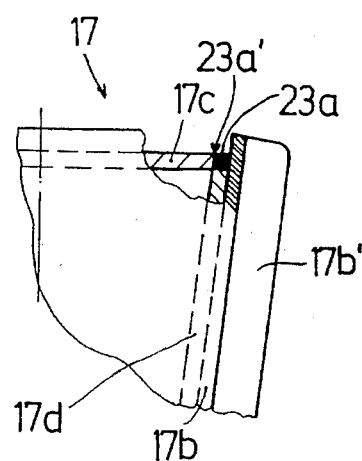

In accordance with a preferred embodiment of the present invention, as shown in FIG. 2g, each side wall 17b may preferably have an outwardly curving flange 17b' at an upper portion thereof. Additionally, reinforcement plate 17c may essentially be considered as having an upper pair of the aforementioned tabs 17c' and a lower pair of tabs 17c'. Preferably, immediately-beneath the lower pair of tabs 17c', there may preferably be rounded indentations 17c". Thus, as illustrated, each rounded indentation 17c" may preferably be configured to indent into the lower corners of reinforcement plate 17c essentially in the manner of a quarter-circle. The dimensions of the rounded indentations 17c", i.e. the radii of curvature, preferably do not represent a significant proportion of the height dimension, that is the top-to-bottom dimension, of reinforcement plate 17c.

In accordance with a preferred embodiment of the present invention, welds 23a and 23b, on either side of the decompression limit stop bracket, may preferably be applied substantially continuously by one welding jig. Thus, in such an instance, the welding jig would preferably be configured to first apply one of the welds 23a, 23b and then, essentially without stopping, apply the other of the two welds 23a, 23b. Conceivably, this could be accomplished by way of the aforementioned "tipping" action.

Alternatively, the welding jig for applying welds 23a and 23b could be configured to first apply one of the welds 23a, 23b and then, after a brief pause, and while the aforementioned "tipping" action is still being Undertaken, apply the other of the two welds 23a, 23b.

In accordance with a preferred embodiment of the present invention, as shown in FIG. 2g, the aforementioned "groove", indicated at 23a', for accommodating weld seam 23a, on each side of the decompression limit stop bracket, may essentially be considered as being defined within, and thus essentially bound by: the corresponding side wall 17b, the corresponding upper and lower tabs 17c', a vertical edge 17c''' on reinforcement plate 17c' defined between the corresponding upper and lower tabs 17c' and an edge of plate 17d adjoining the edge 17c'''. Thus, groove 23a' may, according to a preferred embodiment of the present invention, essentially be considered to be a generally rectangular indentation into the vertical edges of reinforcement plate 17c.

With regard to the application of weld seam 23a, according to one preferred embodiment of the present invention, the weld itself may be applied, in a known manner, into substantially small gaps between tabs 17c' and side walls 17b and substantially small gaps between tabs 17c' and guide plate 17d, as well as into the relatively larger gap constituted by groove 23a'. In this respect, the groove 23a' could essentially be considered to be a pocket for accommodating what might otherwise be considered as overflow from application of the weld to the aforementioned substantially small gaps. Alternatively, the weld may be applied substantially exclusively into the groove 23a' in order to achieve the simultaneous bonding of each side wall 17b with guide plate 17d and reinforcement plate 17c.

As illustrated, the width of the groove 23a' is preferably such to afford a significant increase in bonding strength in comparison with an arrangement which does not include such a groove. More particularly, the groove 23a' may preferably have a width substantially equivalent to the thickness of guide plate 17d and, additionally, may have a depth, that is, the dimension defined parallel to the thickness of reinforcement plate 17c, substantially equivalent to the thickness of reinforcement plate 17d. These dimensions may be best appreciated from FIG. 2h.

Figure 3A:
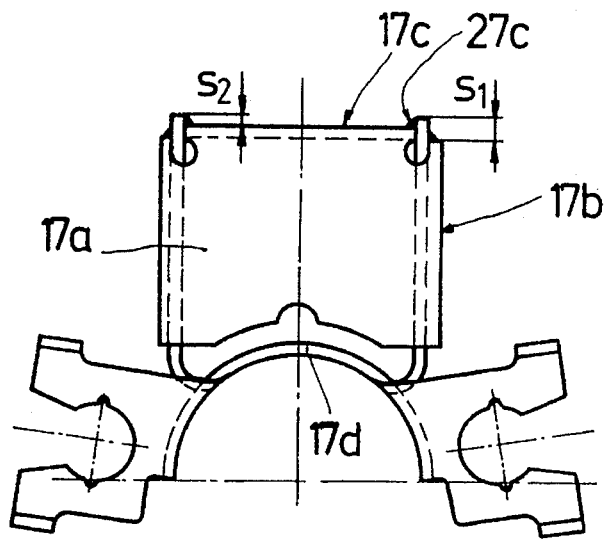
FIGS. 3a–3c illustrate a two-piece decompression stop limit bracket.
Figure 3B:
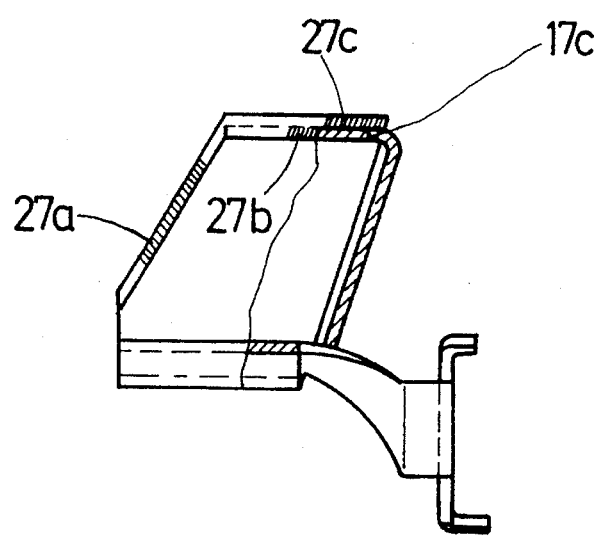
Figure 3C:
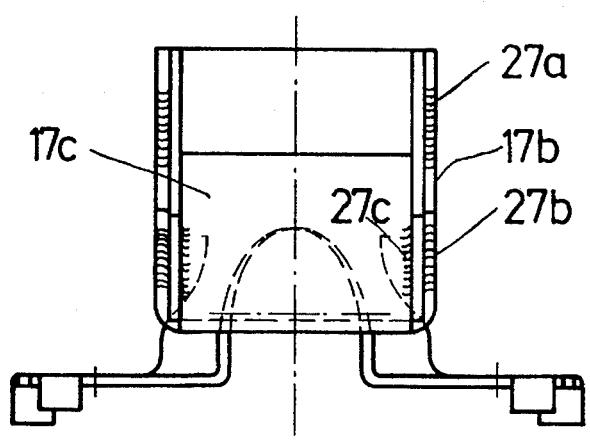

FIGS. 3a to 3c illustrate a decompression stop limit bracket 17 which, according to another preferred embodiment of the present invention, essentially includes only two components. First, the reinforcement plate 17c and the base plate 17a with the side walls 17b may essentially be considered as forming one component. Next, in the configuration shown in FIGS. 3a to 3c, the guide plate 17d can preferably be positioned with respect to the composite component (17a, 17b, 17c) so that guide plate 17d is essentially enclosed by the composite component (17a, 17b, 17c).

The composite component (17a, 17b, 17c) preferably has an edge distance s1 or s2 from the guide plate, as shown in FIG. 3a. These edge distances can preferably form the basis for fillet welds 27a, 27b between the side walls 17b and the guide plate 17d, as well as for the weld seams 27c.

It is once again possible to provide a brake hose bracket 25 and configure the same so as to constitute a single, integral piece with respect to the base plate 17a. Alternatively, brake hose bracket 25 could preferably be configured to constitute a single, integral piece with respect to guide plate 17d.

FIGS. 3d through 3f represent, respectively, essentially the same views as FIGS. 3a through 3c, but are more detailed. Preferably, in accordance with a preferred embodiment of the present invention as illustrated in FIGS. 3a and 3d, the guide plate 17d may be essentially disposed within the confines of the composite component (17a, 17b, 17c). In an alternative embodiment of the present invention, as shown in FIG. 3g, the guide plate 17d could conceivably be disposed external to the side walls 17b.

In the embodiment illustrated in FIGS. 3a through 3f, the edge distances s1 and s2 are preferably configured so as to provide an essentially optimal foundation for the placement of the respective welds 27b, 27c. More particularly, these distances s1 and s2 can preferably be chosen so as to allow for the placement of welds appropriate for providing increased strength for the decompression stop limit bracket 17.

In accordance with at least one preferred embodiment of the present invention, distance s1 may, as shown, preferably be greater than distance s2.

As shown ill FIGS. 3a and 3d, base plate 17a may preferably include generally circular notches 17a' at the general locations where base plate 17a, respective side wall 17b, reinforcement plate 17c and guide plate 17d all essentially meet. Preferably the generally circular notches can be configured so as to provide a first edge 17a' for abutting directly against the guide plate 17d, as well as a second edge 17a''' for being oriented perpendicular to the respective guide plate 17d, whereby the generally circular notch 17a' essentially provides an interior curved surface, preferably having an angular extent of about 270°, connecting ends of the edges 17a'' and 17a'''. If appropriate, the interior curved surface of each generally circular notch 17a' may be quasi-helical, so as to permit the abutment of the first edge 17a' against guide plate 17d while still permitting guide plate 17d to be disposed essentially atop base plate 17a.

The welds 27b, 27c, as illustrated, can preferably be applied in an economical manner, such as by the rapid application of two different welds 27b, 27c, one subsequent to the other or, conceivably, by the application of the two welds 27b, 27c, simultaneously and in parallel. Alternatively, if sufficient to provide the desired strength, it Is conceivable to apply only one of the illustrated welds 27b, 27c.

In an alternative embodiment of the present invention, such as in a configuration in which the guide plate 17d is disposed outside of side walls 17b, one fillet weld can conceivably join each side wall 17b, the reinforcement plate 17c, and the guide plate 17d together simultaneously, much as in the embodiments discussed further above in relation o FIGS. 2a–2h. One conceivable type of such a joining is illustrated in FIG. 3g. Further, in such an instance, reinforcement plate 17c could conceivably include a groove-type indentation similar to the groove 23a' discussed further above in order to provide a different degree of bonding in the manner discussed further above.

Similarly to he embodiments of the present invention discussed further above with relation to FIGS. 2a–2h, the weld 27a could conceivably be applied continuously with respect to either or both of the welds 27b, 27c, or could be applied after a short pause after the application of either or both of the welds 27b, 27c wherein, in either case, the application of weld 27a could preferably be facilitated via a tipping action of the welding jig or other related instrument being employed.

FIGS. 4a to 4d show, in accordance with another preferred embodiment of the present invention, a one-piece design of the decompression stop limit bracket 17. Essentially, all the individual parts have been Combined into a single bent sheet metal component. FIG. 4d shows this arrangement particularly clearly, in the form of a developed view of the decompression stop limit bracket 17. The brake hose bracket 25 can be, but need not necessarily be, a part of the bent component.

Thus, FIG. 4a–4c essentially illustrate the single bent sheet metal component as formed, while FIG. 4d illustrates the single bent sheet metal component in "unbent" form. In accordance with at least one preferred embodiment of the present invention, the "unbent" component illustrated in FIG. 4d may be construed as the original form which is ultimately bent to form the "completed" component illustrated in FIG. 4a–4c.

The decompression stop limit bracket 17 is designed symmetrically, so that the base plate 17a and the reinforcement plate 17c essentially each preferably include two halves which meet at a central axis of symmetry. Preferably, there are weld seams 29a and 29b, for connecting, respectively, the halves of base plate 17a and of reinforcement plate 17c, to thereby essentially close the decompression Sop limit bracket 17 along the aforementioned axis of symmetry. Once again, the configuration according to the invention has he advantage that the weld seams are essentially located in a plane. But, as illustrated in FIGS. 4a–4d, the brake hose bracket can also be located closer to the decompression stop limit bracket 17, since in this configuration the dimension $l_1$ can essentially be considered to be smaller than if the base plate 17a consisted of only one sheet metal segment.

FIGS. 4e–4g represent, respectively essentially the same views as FIGS. 4a–4c, but are more detailed.

In accordance with the embodiment of the present invention illustrated in FIGS. 4a–4g, it will be appreciated that, having been formed from a single plate, the decompression stop limit bracket 17 can still be essentially fabricated with the use of essentially only one weld or se of welds located essentially in the same plane. With regard o the aforementioned feature of connecting side walls 17b with guide plate 17d and reinforcement plate 17c, it will now be appreciated that, in accordance with at least one embodiment of the present invention, side walls 17b can essentially be considered to provide the same function as, and thus double as, what would be regarded as radially extending walls of guide plate 17d in the embodiments of FIGS. 2a–3f. To this effect, the decompression stop limit bracket 17 illustrated in FIGS. 4a–4g could preferably be derived from a metal significantly strong to permit side walls 17b to double as radial walls of guide plate 17d. Alternatively, side walls 17b could solely be provided with an excess thickness with comparison to the thicknesses of, for example base plate 17a and reinforcement plate 17c. Alternatively, side walls 17b, having a thickness similar to that of base plate 17a and reinforcement plate 17c, could essentially be of sufficient strength so as to perform substantially the same functions as the embodiments of decompression stop limit bracket 17 discussed and illustrated heretofore with respect to FIGS. 2a–3f.

In accordance with at least one preferred embodiment of the present invention, it will be appreciated that the base plate 17a and the reinforcement plate 17c may be construed as having constituent portions that are Joined by weld seams 29a and 29b, respectively. In one embodiment of the present invention, the "constituent portions" of each of base plate 17a and reinforcement plate 17c may be construed as "halves" of base plate 17a and reinforcement plate 17c, respectively. Preferably, the "constituent portions" of each of base plate 17a and reinforcement plate 17c will include facing edges that are parallel to one another, along which facing edges the weld seams 29a and 29b may preferably be applied.

With regard to weld seams 29a and 29b, it will be appreciated that, similarly to the embodiments of the FIGS. 2a–3f, the welds could conceivably be applied continuously or could be applied with a pause in between the applications of welds 29a and 29b, wherein, in both cases, there may preferably be an associated tipping action of the employed welding jig to permit the application of both weld seams 29a and 29b in essentially the same job.

Conceivably, the two halves of reinforcement plate 17c could be provided with a groove arrangement similar to that discussed heretofore with relation to FIGS. 2a–2h, to provide an alternative type of foundation for the application of weld seam 29b.

In accordance with a preferred embodiment of the present invention, as illustrated in FIG. 4e, base plate 17a may preferably be provided with rounded indentations 17a"" in the vicinity of the junction of plate 17a with reinforcement plate 17c and respective side walls 17b. These rounded indentations may preferably resemble quarter-circle indentations and, as such, may preferably describe arcs of about 90°. Concurrently, reinforcement plate 17c and side walls 17b may preferably be configured such that an open overlap 17" may essentially be provided over rounded indentations 17a''', at least when viewed in the orientation depicted in FIG. 4e.

Preferably, as shown in FIG. 4g, reinforcement plate 17c may itself be provided with rounded indentations 17c''', substantially similar, in form and dimension, to the rounded indentations 17a"" of base plate 17a. Additionally, similarly to the open overlaps 17" described heretofore with relation to FIG. 4e, side walls 17b and base plate 17a may preferably be configured such that an open overlap 17"" may essentially be provided with respect to rounded indentations 17c''', at least when viewed in the orientation depicted in FIG. 4g.

FIG. 5 is essentially restricted to an illustration of a pertinent portion of a shock absorber 1. The following description relates to the decompression stop limit bracket 17 illustrated in FIGS. 3a–3c, which has hereby been selected as an example.

Essentially, in FIG. 5, the guide plate 17d is preferably welded to the container tube 9 by means of a weld seam 31. The broken line 33 shows the contour of a side wall according to at least one known arrangement, whereby in the at least one known arrangement, the weld seam was essentially made on the end surface of the side wall. The scale drawing of FIG. 5, by means of the illustrated length $l_2$, essentially gives an idea of the reduction of the bending moment which is achieved, when the decompression stop limit bracket 17 comes in contact with the body-side support surface (such a body-side support surface being indicated at 19 in FIG. 1).

Thus, in other words, the length $l_2$ illustrated in FIG. 5 can essentially allow one of ordinary skill in the art to appreciate the aforementioned reduction of bending moment. In at least one preferred embodiment of the present invention, the length $l_2$ may essentially be considered to be indicative of the reduction of material which may be possible if the present invention is employed; that is, owing to the increased strength provided in the embodiments of the present invention illustrated in FIGS. 1–4g, it may not be necessary for the decompression stop limit bracket to be supported over as great a circumferential extent of tube 9 as may have previously been necessary.

The disclosure now turns to additional embodiments of the present invention which may, if appropriate, be utilized in conjunction with the embodiments discussed hereinabove with relation to FIGS. 1–5.

FIGS. 6a and 6b illustrate an outer tube 1' for a shock absorber 3', which in this case is illustrated as a telescoping strut. A fastening device 5' is welded to its lower end. The fastening device 5' comprises, among other things, a receptacle 7' for a steering stub axle (not shown) of a motor vehicle. In the vicinity of the receptacle 7', the fastening device is preferably designed as a flat body. The receptacle 7' is connected to a connecting web 9'. The width of this connecting web 9' preferably represents an essentially ring-shaped section 11', the inside diameter of which is preferably adapted to the outside diameter of the outer tube 1'. The upper end of the fastening device '5 is preferably formed by a roll stabilizer mounting 13'.

The one-piece design of the fastening device 5' makes it possible to achieve substantially exact dimensions and to observe tolerances for the distance between the receptacle 7' and the holes 15' of the roll stabilizer 13' much more closely than in other known devices.

There are also advantages in terms of the usable length of the weld seams. The connecting web 9', which runs essentially in the axial direction, offers many possible applications without any risk of distortion. The connecting web 9' can also permanently increase the rigidity of the fastening device 5'.

In the illustrated configuration, the size of the stamping blank used for producing the fastening device can be determined essentially by the distance between the holes 15' of the roll stabilizer mounting 13' and the receptacle 7'.

FIGS. 7a–7c show a fastening device in isolation, like the one illustrated in FIGS. 6a–6b. An additional component in FIGS. 7a–7c is a brake hose holder 17' which can alternatively be used to hold a brake wear indicator. In the circumferential direction, brake hose holder 17' encloses, that is, surrounds, the connecting web 9', whereby the length is selected so that in its development, it does not increase the width of the stamping blank.

FIGS. 8a–8d show a fastening device 5', in particular as used for a shock absorber on a rear axle.

The receptacle 7' for the steering stub axle is essentially identical to those in the embodiments illustrated in FIGS. 6a, 6b, and 7a–7c. A brake hose mounting 17' is preferably used, which in turn is preferably coupled to the receptacle 7' by means of a connecting web 9'. The connecting web 9' preferably includes a flat section which makes the transition into a ring-shaped section, to which are attached the mountings 17' for the brake hoses or ABS.

Figure 8A:
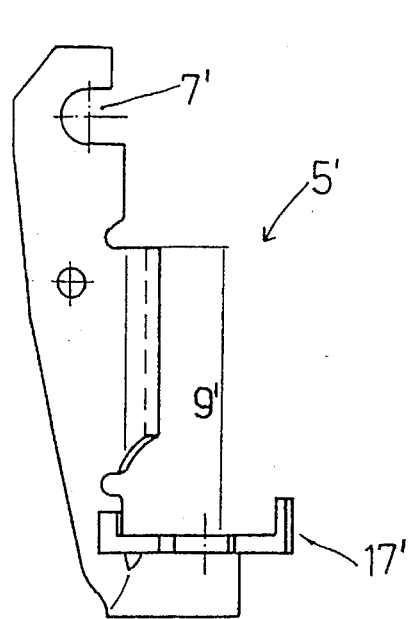
Figure 8D:
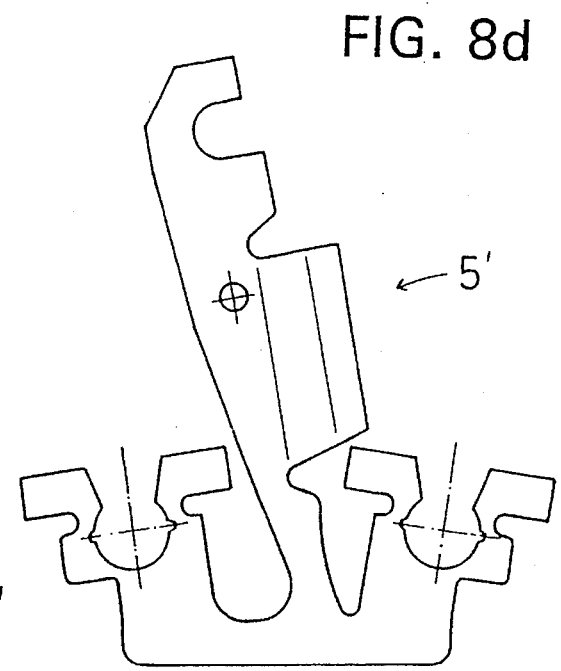
Figure 8B:
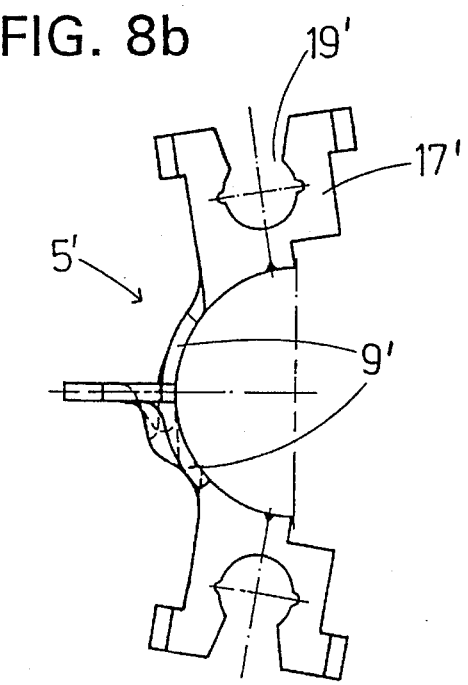
Figure 8C:
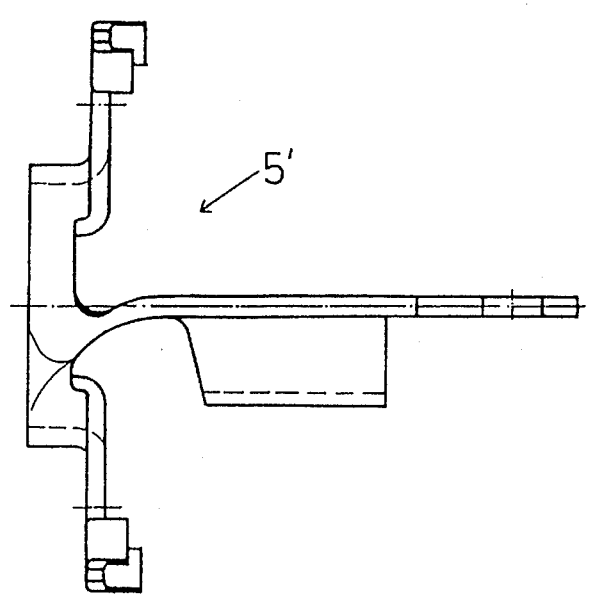

FIG. 8d shows very clearly the dimensions for a stamping blank. Essentially, the most important dimension is essentially the distance between the receptacle 7' and the brake house mounting 17' and the notches 19' of the brake hose mounting 17'.

The disclosure now turns to a more detailed discussion of the preferred embodiments of the present invention.

In accordance with a preferred embodiment of the present invention, as shown in FIGS. 6a, 6b, 9a and 9b, fastening device 5' may preferably include a receptacle 7' for a steering stub axle of a motor vehicle and a roll stabilizer mounting 13'. Receptacle 7' and roll stabilizer mounting 13' are preferably rigidly connected to one another via connecting web. 9'. A longitudinal axis 20' is preferably defined through the shock absorber in question and therefore through outer tube 1'.

As shown in FIGS. 9a and 9b roll stabilizer mounting 13' may preferably be embodied by two flat and coplanar sections 21' and a semiannular section 23' interconnecting the flat sections 21'. A hole 15' is preferably disposed through each of the flat sections 21'. Semiannular section 23' is preferably configured to interface in close contact with the external cylindrical surface of outer tube 1' of shock absorber 3', over about half of the circumferential extent of the external cylindrical surface of outer tube 1'. Thus, the inner diameter of semiannular section 23' preferably essentially corresponds to the outer diameter of outer tube 1'.

As shown receptacle 7' is preferably indented into a longitudinal extension 25' of fastening device 5'. Longitudinal extension 25' is preferably configured for being oriented longitudinally along the longitudinal extent of outer tube 1'. Longitudinal extension 25' itself preferably lies in a plane which is parallel to the longitudinal axis 20' of outer tube 1' and shock absorber 3' and perpendicular to the plane in which flat sections 21' of roll stabilizer mounting 13' lie.

Preferably, in accordance with a preferred embodiment of the present invention, receptacle 7' may be indented into a lower portion 27' of longitudinal extension 25' of fastening device 5'. Preferably, as shown, a major portion of longitudinal extension 25' of fastening device 5', and, accordingly, of connecting web 9', can be welded onto outer tube 1' by way of a longitudinal weld 29' whereas the aforementioned lower portion 27' is not. Thus, lower portion 27' of longitudinal extension 25' of fastening device 5' is preferably not in contact with the external surface of outer tube 1' and can preferably be slightly spaced apart therefrom. Receptacle 7' may preferably be embodied by a generally semi-circular slot, wherein the open portion of the slot faces outer tube 1' and opens into the space between lower portion 27' of fastening device 5' and the external cylindrical surface of outer tube 1'. Roll stabilizer mounting 13' can preferably be welded onto outer tube 1' by way of longitudinal welds 30' one of which is shown in FIG. 9a.

Connecting web 9' is preferably configured to run longitudinally along outer tube 1' to connect roll stabilizer mounting 13' and longitudinal extension 25'. As such, connecting web 9' is preferably embodied by a transition portion 31', an elongated neck portion 33' and a terminal portion 35'. Neck portion 33' is preferably of a reduced circumferential extent, such as about 30 to 60 degrees, while transition portion 31' preferably rigidly connects semiannular portion 23' with neck portion 33' while making a smooth, curved transition between semiannular portion 23' and neck portion 33'. A major portion of neck portion 33' is preferably welded to outer tube 1' by a second longitudinal weld 37', as shown. Terminal portion 35' preferably has a circumferential extent of about between 30 and 90 degrees, preferably greater than that of neck portion 33', and is preferably welded to outer tube 1' by way of a third longitudinal weld 39'. Preferably, as shown, longitudinal extension 25', especially lower portion 27' thereof, extends a significant distance longitudinally beyond terminal portion 35' of connecting web 9'.

It will be appreciated that the distance between holes 15' of roll stabilizer mounting 13', as well as the longitudinal distance between holes 15' and receptacle 7', can essentially serve as parameters for determining the size of the stamping blank for forming the fastening device 5' according to the present invention.

FIGS. 7a–7c and 10a–10c illustrate, in isolation, the fastening device 5' shown in FIGS. 6a, 6b, 9a and 9b. As shown, in accordance with another preferred embodiment of the present invention, a brake hose holder 17' may be included as part of fastening device 5'. As shown, brake hose holder 17' may preferably be located between roll stabilizer mounting 13' and lower portion 25' of fastening device 5'. Preferably, the length of the brake hose holder 17' can be chosen such that the width of the stamping blank used to form the fastening device is not increased.

FIGS. 8a–8d and 11a–11d illustrate a fastening device 5' which may preferably be utilized on a rear axle. Particularly, the fastening device 5' illustrated in FIGS. 8a–8d and 11a–11d does not have a roll stabilizer mounting.

Preferably, in the embodiment illustrated in FIGS. 8a–8d and 11a–11d, the receptacle 7' for the steering stub axle is essentially identical to that illustrated for the embodiment of FIGS. 6a, 6b, 9a and 9b, and that of FIGS. 7a–7c and 10a–10c'. As shown, a brake hose holder, or mounting, 17' may preferably be included. Thus, in accordance with a preferred embodiment of the present invention, brake hose mounting 17' is preferably connected to receptacle 7' by means of connecting web 9'.

As illustrated in FIGS. 11a–11c, connecting web 9' may preferably be embodied by a longitudinal extension 25' an arcuate portion 41' extending from longitudinal extension 25', and a lower, semiannular portion 43'. Longitudinal extension 25', with receptacle 7' indented therein, may preferably be configured similarly to the longitudinal extension 25' of the embodiment of FIGS. 6a, 6b, 9a and 9b. Accordingly, longitudinal extension 25' Can preferably be configured so as to be oriented along a radius of the shock absorber in question when placed on the shock absorber. Arcuate portion 41' preferably extends from a base of longitudinal extension 25', that is, from that portion of longitudinal extension 25' which will be adjacent outer tube 1' (not shown), and preferably describes an arc of about 90°. When mounted on outer tube 1' (not shown), arcuate portion 41' will preferably interface in close contact with outer tube 1'. Accordingly, the arc described by arcuate portion 41' preferably has a diameter roughly corresponding to that of the outer tube 1' on which the fastening device 5' is to be mounted.

Brake hose mounting 17' can preferably be embodied by two mounting portions 45', each of which preferably extends from semiannular portion 43'. Each mounting portion preferably includes a base portion 47', wherein each base portion 47' is preferably configured to generally lie in a plane perpendicular to the longitudinal axis of outer tube 1' and perpendicular to the plane defined by longitudinal extension 25'. Notches 19' are preferably embodied by generally circular holes, with a notch-like indentation opening into the circular hole. Notches 19' are preferably indented into base portions 47'.

Preferably extending from each base portion 47', in a direction parallel to the longitudinal axis of the outer tube, are flange portions 49'. Each mounting portion 45' preferably includes two such flange portions 49', and each flange portion 49' preferably extends towards receptacle 7'.

As shown in FIG. 11b, the centers of the circular portions of notches 19' are preferably not aligned along a common axis, but are preferably aligned along axes which form a shallow acute angle, such as an angle of between about 3° and about 15°, with respect to each other. In an alternative embodiment of the present invention, the centers of the circular portions of notches 19' may be aligned along a common axis.

FIG. 11d illustrates a stamping blank 5a' which may preferably be utilized to form, i e. by bending, the fastening blank 5' shown in FIGS. 11a–11c. Portions 25a', 41a', 43a' and 45a' for forming, respectively, longitudinal extension 25', arcuate portion 41', semiannular portion 43' and mounting portions 45', are illustrated. Portion 25a' preferably includes receptacle 7a', as shown. It will be appreciated that the longitudinal distance between receptacle 7a' and brake hose mountings 45a', as well as the distance between notches 19a', can preferably serve as important parameters for determining the size of stamping blank 5a'.

FIG. 12 illustrates a shock absorber 100', having an outer tube 101', which may be utilized in accordance with the embodiments of the present invention. As illustrated in FIG. 12, an adjustable two-tube shock absorber can generally include a cylinder 1", which sealingly contains a hydraulic fluid, a piston rod 2", which piston rod 2" can sealingly project into cylinder 1" and which piston rod 2" can be axially displaceable with respect thereto, and a damping piston 3", which damping piston 3" can be sealingly disposed within cylinder 1" and can be connected to piston rod 2". Piston rod 2" can be attached to a structure portion, e.g., of a vehicle, which is not shown. Piston 3" can divide cylinder 1" into upper and lower working chambers 4" and 5", respectively, and can be provided with axially throughgoing passages and associated bottle valves 8" of conventional design and well known in the art, which can provide a substantially constant and non-variable resistance to the axial displacement of piston 3" and piston rod 2".

Two additional cylinders of progressively greater diameter, including a cylinder 22" and outer tube 101', can be disposed coaxially with cylinder 1" so as to surround cylinder 1", thereby providing two additional annular chambers, a bypass chamber 9" and an equalization chamber 21". Bypass chamber 9" can preferably interconnect with the working chambers via orifices 23", and a valve 20", located at the bottom of cylinder 1". The bypass chamber 9" can preferably provide a means by which the damping medium contained therein can reach equalization chamber 21".

A damping force control unit 24", which can act hydraulically in parallel with throttle valves 8" to modify the substantially constant damping force which throttle valves 8" can provide, can be mounted as a separate component attached to the shock absorber, and can be in fluid communication With bypass 9" and equalization chamber 21".

It should be understood that the shock absorber illustrated in FIG. 12 is provided as an example of a type of shock absorber on which the fastening device according to the present invention may be utilized, and that the fastening device according to the present invention may essentially be utilized on any appropriate shock absorber.

Based on the disclosure hereinabove, the advantages of a fastening device according to the present invention should generally be clear to a routineer in the field of the invention. It should also be appreciated that, according to another, alternative, embodiment of the present invention a fastening device according to the present invention provides advantages during an automatic welding process. Particularly, whereas, in the case of prior known fastening devices, it would usually be necessary for two parts of a welding jig to hold separate corresponding fastening elements on the outer tube of a shock absorber during automatic welding, the single fastening element of the present invention would essentially only require that one part of a welding jig hold essentially the entire fastening element on the outer tube of a shock absorber during automatic welding. This would essentially provide advantages in terms of handling and precision.

It should be understood that the components and methods discussed above with relation to FIGS. 6a–12 may, if appropriate, essentially be considered to be interchangeable with similar components and methods discussed further above with relation to FIGS. 1–5.

For example, it will be appreciated that the decompression limit stop bracket 17 illustrated and described with relation to FIGS. 1–5 may, in accordance with at least one preferred embodiment of the present invention, be considered to provide a function similar to that provided by the roll stabilizer mounting 13' illustrated and described with relation to FIG. 6a–12.

Additionally, the welded mounting of decompression limit stop bracket 17 on container tube 9 (see FIGS. 1 and 5) could, in accordance with at least one preferred embodiment of the present invention, be undertaken in a manner similar to that illustrated and described hereinabove for mounting, by welding, fastening device 5' on outer tube 1' of shock absorber 3'(see FIG. 6a, 6b, 9a and 9b).

One feature of the invention resides broadly in the shock absorber, in particular a MacPherson strut unit, with a decompression stop limit bracket which is fastened to a container tube and which, in the event of a rebound of a vehicle axle, comes into contact with a body-side support surface, comprising a base plate with side walls, which is welded to a reinforcement plate and a radial guide plate which is connected to the container tube, characterized by the fact that the side walls 17b and the guide plate 17d as well as the reinforcement plate 17c form a groove which is filled by a weld seam 23a, so that all the parts 17b; 17c; 17d forming the groove are connected to one another by means of the weld seam 23a.

Another feature of the invention resides broadly in the shock absorber characterized by the fact that the reinforcement plate 17c comes in contact on its ends with the guide plate 17d by means of tabs 17c.

Yet another feature of he invention resides Broadly in the shock absorber characterized by the fact that the base plate 17a and the reinforcement plate 17c form a component which is welded to the guide plate 17d.

Still another feature of the invention resides broadly in the shock absorber characterized by the fact that the component 17a; 17c is optionally applied to the guide plate 17d inside or outside.

A further feature of the invention resides broadly in the shock absorber characterized by the fact that the component 17a, 17d has an edge distance $s_1$, $s_2$ from the guide plate 17d, which is at least wide enough that a fillet weld 27a, 27b; 27c can be laid down between the component 17a; 17c and the guide plate 17d.

Another feature of the invention resides broadly in the shock absorber characterized by the fact that the entire decompression stop limit bracket 17 is formed from a single bent component.

Yet another feature of the invention resides broadly in the shock absorber characterized by the fact that the weld seams 23a; 23b; 27a; 27b; 29a; 29b closing the bent component lie in a plane.

Yet another feature of the invention resides broadly in the shock absorber characterized by the fact that a brake hose bracket 25 is formed as one piece with the decompression stop limit bracket 17.

Still another feature of the invention resides broadly in the shock absorber characterized by the fact that the weld seams 29a; 29b lie within the axis of symmetry of the decompression stop limit bracket 17.

A further feature of the invention resides broadly in the shock absorber characterized by the fact that the guide part 17d is welded to the container tube 9.

Examples of shock absorbers, which may be utilized in accordance with the embodiments of the present invention, may be found in the following U.S. Pat. No. 4,669,586 to Mettler, entitled "Pipe-Type Housing for a Shock Absorber Particularly of the Telescopic Vibration Damper Type"; U.S. Pat. No. 4,660,436 to Davoust and Pelus, entitled "Viscous Vibration Dampers"; and U.S. Pat. No. 3,901,359 to Jentsch, entitled "Hydraulic Twin-Tube Vibration Damper".

One concept of the invention relates to a vibration damper, such as a MacPherson strut, comprising:
- a first end and a second end;
- an outer tube disposed between said first end and said second end;
- said first end comprising means for connecting said vibration damper to a first body;
- said second end comprising means for connecting said vibration damper to a second body;
- said outer tube having an external surface;
- said outer tube defining a circumference at said external surface;
- a chamber defined within said outer tube;
- said chamber containing a damping fluid;
- a piston rod sealingly projecting into said chamber and being axially displaceable with respect to said outer tube;
- a piston attached to said piston rod, said piston being disposed within said chamber to sealingly divide said chamber into first and second chambers;
- means for permitting fluid communication between said first and second chambers;
- said vibration damper defining a central longitudinal axis, the central longitudinal axis defining an axial direction of said vibration damper;
- bracket means extending outwardly from said outer tube in a generally radial direction with respect to said longitudinal axis;
- said bracket means having means for limiting axial displacement of at least a portion of said vibration damper;
- said means for limiting axial displacement comprising means for striking an external object to cease axial displacement of said at least a portion of said vibration damper;
- said bracket means comprising:
  - a back portion disposed adjacent said external surface of said outer tube, said back portion extending over a portion of the circumference of said outer tube;
  - a pair of side portions extending radially outwardly from said external surface of said outer tube;
  - each of said pair of side portions being spaced apart from one another;
  - a front portion extending between said pair of side portions, said front portion being spaced apart from said back portion;
  - a single weld for simultaneously and operatively connecting a portion of said front portion with: said back portion; and at least one of said side portions. Another concept relates to the vibration damper, wherein said side portions of said bracket means further comprises:
- each of said side portions comprises a lower portion;
- said bracket means further comprises a bottom portion extending between said lower portions of said side portions; and
- said bottom portion comprises said means for striking an external object to cease axial displacement of said at least a portion of said vibration damper.

Another concept relates to the vibration damper, wherein said bracket means comprises:
- guide plate means;
- said guide plate means having a back portion and a pair of side portions;
- said back portion of said guide plate means comprising said back portion of said bracket means;
- said side portions of said guide plate means extending radially outwardly from said back portion of said guide plate means;
- said side portions of said guide plate means being spaced apart from one another;
- a component comprising a bottom portion and a pair of side portions;
- said bottom portion of said component comprising said bottom portion of said bracket means;
- said bottom portion of said component extending between said side portions of said component;
- said side portions of said component being spaced apart from one another;
- each of said side portions of said bracket means comprising:
  - one of said side portions of said guide plate means;
  - one of said side portions of said component;
  - said one of said side portions of said guide plate means and said one of said side portions of said component being disposed substantially directly adjacent to one another and substantially parallel to one another; said front portion of said bracket means comprises reinforcement plate means extending between said pair of said side portions of said bracket means; and
- said single weld being disposed to directly connect a portion of each of:
  - one of said side portions of said guide plate means;
  - one of said side portions of said component; and
  - said reinforcement plate means; with one another.

Yet another concept relates to the vibration damper, further comprising:
- said one of said side portions of said guide plate means having a first edge portion;
- said one of said side portions of said component having an internal surface facing towards the other of said side portions of said component;
- said reinforcement plate means having a second edge portion;
- said first edge portion, said second edge portion, and said internal surface all being oriented substantially parallel to one another and to said longitudinal axis of said vibration damper;
- said one of said side portions of said guide plate means, said one of said side portions of said component, and said reinforcement plate means all being disposed to define a locus of placement of said single weld; and
- said locus of placement of said single weld being substantially linear and being oriented substantially parallel to said first edge portion, said second edge portion and said internal surface.

Yet another concept relates to the vibration damper, wherein:
- said bracket means further comprises an additional single weld being disposed to directly connect a portion of each of:

the other of said side portions of said guide plate means; the other of said side portions of said component; and said reinforcement plate means; with one another means;

said single weld is disposed to directly connect said first edge portion, said second edge portion and said internal surface with one another.

Still another concept of the invention relates to the vibration damper, wherein:

said reinforcement plate means comprises first extension means and second extension means;

said first extension means and said second extension means both being disposed to extend from said second edge portion of said reinforcement plate means and contact said one of said side portions of said component; and said locus of placement of said single weld being defined between said first extension means and said second extension means.

A further concept relates to the vibration damper, further comprising:

said first edge portion having a width, corresponding to a thickness of said one of said side portions of said guide plate means;

said second edge portion having a width, corresponding to a thickness of said reinforcement plate means;

said single weld being disposed to connect said first and second edge portions with one another, and with said internal surface, over substantially the entire width of said first edge portion; and said single weld being disposed to connect said first and second edge portions with one another, and with said internal surface, over substantially the entire width of said second edge portion.

Yet another concept relates to the vibration damper, wherein:

said guide plate means, said reinforcement plate means, and said component constitute three different components;

said guide plate means having:
 a first upper edge portion disposed along an upper edge of said one of said side portions of said guide plate means; and
 a second upper edge portion disposed along an upper edge of said other of said side portions of said guide plate means;

said single weld being a first weld portion;

said bracket means further comprises a second weld portion being disposed to connect said first upper edge portion of said guide plate means with said internal surface of said component;

said first weld portion and said second weld portion being disposed to lie in substantially the same plane, wherein the plane is oriented generally parallel with respect to said longitudinal axis of said vibration damper;

said first and second extension means each comprising a tab extending from said second edge portion of said reinforcement plate means, each of said tabs having been formed by a notching process;

said first and second weld portions each being weld seams;

said first and second weld portions having been applied during the same welding process, said bracket means having been held in a welding jig, the welding jig having been tipped to effect a transition between application of said first weld portion and application of said second weld portion;

said locus of placement being generally rectangular in shape;

said bracket means further comprises brake hose bracket means for accommodating at least one brake hose;

said brake hose bracket means being integral with said bracket means and extending downwardly generally from said bottom portion of said component;

said brake hose bracket having:
 a pair of longitudinal portions each being disposed about a portion of the circumference of said outer tube and each extending over an axial portion of said outer tube; and
 a pair of hose-accommodating portions, each of said pair of hose-accommodating portions extending radially outwardly from a corresponding one of said longitudinal portions and in a plane generally perpendicular to said longitudinal axis of said vibration damper, each of said pair of hose-accommodating portions having means for accommodating a brake hose;

said back portion of said bracket means being welded to said outer tube;

the other of said side portions of said guide plate means having a third edge portion;

said other of said side portions of said component having a second internal surface facing towards said one of said side portions of said component;

said reinforcement plate means having a fourth edge portion;

said third edge portion, said fourth edge portion, and said second internal surface all being oriented substantially parallel to one another and to said longitudinal axis of said vibration damper;

said other of said side portions of said guide plate means, said other of said side portions of said component, and said reinforcement plate means all being disposed to defined a second locus of placement, said second locus of placement being a locus of placement of said additional single weld;

said second locus of placement being substantially linear and being oriented substantially parallel to said third edge portion, said fourth edge portion and said second internal surface;

said additional single weld being disposed to directly connect said third edge portion, said fourth edge portion and said second internal surface;

said reinforcement plate means comprises third extension means and fourth extension means;

said third extension means and said fourth extension means both being disposed to extend from said third edge portion of said reinforcement plate means and contact said other of said side portions of said component;

said second locus of placement of said additional single weld being defined between said third extension means and said fourth extension means;

said third edge portion having a width, corresponding to a thickness of said other of said side portions of said guide plate means;

said fourth edge portion having a width, corresponding to a thickness of said reinforcement plate means;

said single weld being disposed to connect said third and fourth edge portions with one another, and with said second internal surface, over substantially the entire width of said third edge portion;

said single weld being disposed to connect said third and fourth edge portions with one another, and with said second internal surface, over substantially the entire width of said second edge portion;

said additional single weld being a third weld portion;

said bracket means further comprises a fourth weld portion being disposed to connect said second upper edge portion of said guide plate means with said second internal surface of said component;

said third weld portion and said fourth weld portion being disposed to lie in substantially the same plane, wherein the plane is oriented generally parallel with respect to said longitudinal axis of said vibration damper;

said third and fourth extension means each comprising a tab extending from said third edge portion of said reinforcement plate means, each of said tabs having been formed by a notching process;

said third and fourth weld portions each being weld seams;

said third and fourth weld portions having been applied during the same welding process, said bracket means having been held in a welding jig, the welding jig having been tipped to effect a transition between application of said third weld portion and application of said fourth weld portion; and said second locus of placement being generally rectangular in shape.

Yet another concept of the invention relates to the vibration damper, wherein said bracket means comprises:

guide plate means;

said guide plate means having a back portion and a pair of side portions;

said back portion of said guide plate comprising said back portion of said bracket means;

said side portions of said guide plate means extending radially outwardly from said back portion of said guide plate means;

said side portions of said guide plate means being spaced apart from one another;

a component comprising a bottom portion and a pair of side portions;

said bottom portion of said component comprising said bottom portion of said bracket means;

said bottom portion of said component extending between said side portions of said component;

said side portions of said component being spaced apart from one another;

each of said side portions of said bracket means comprising:
one of said side portions of said guide plate means;
one of said side portions of said component;
said one of said side portions of said guide plate means and said one of said side portions of said component being disposed substantially directly adjacent to one another and substantially parallel to one another;

said component further comprises a front portion extending between said side portions of said bracket means;

said front portion of said component comprising said front portion of said bracket means; and said single weld being disposed to operatively connect a portion of each of:
one of said side portions of said guide plate means;
one of said side portions of said component; and
said front portion of said component; with one another.

Yet another concept of the invention relates to the vibration damper, further comprising:

said one of said side portions of said guide plate means having a first edge portion;

said one of said side portions of said component having an internal surface facing towards the other of said side portions of said component;

said front portion of said component having an outer surface facing away from said outer tube;

said first edge portion, said outer surface, and said internal surface all being oriented substantially parallel to one another and to said longitudinal axis of said vibration damper;

at least:
said one of said side portions of said guide plate means; and
said front portion of said component; being disposed to define a locus of placement of said single weld; and said locus of placement of said single weld being substantially linear and being oriented substantially parallel to said first edge portion, said outer surface and said internal surface.

A further concept of the invention relates to the vibration damper, wherein:

said bracket means further comprises an additional single weld being disposed to operatively connect a portion of each of:
the other of said side portions of said guide plate means;
the other of said side portions of said component; and said front portion of said component; with one another;

said single weld being a fillet weld; and said outer surface being separated from said first edge portion so as to adequately provide said locus of placement for said fillet weld constituted by said single weld.

Still another concept relates to the vibration damper, wherein said pair of side portions of said guide plate means are both disposed between said side portions of said component, such that said side portions of said component flank said side portions of said guide plate means.

Yet another concept relates to the vibration damper, wherein said single weld is disposed to directly connect said outer surface and said internal surface with one another.

Another concept of the invention relates to the vibration damper, wherein:

said guide plate means and said component constitute two different components;

said guide plate means having:
a first upper edge portion disposed along an upper edge of said one of said side portions of said guide plate means; and
a second upper edge portion disposed along an upper edge of said other of said side portions of said guide plate means;

said single weld being a first weld portion;

said bracket means further comprises a second weld portion being disposed to connect said first upper edge portion of said guide plate means with said internal surface of said component;

said first weld portion and said second weld portion being disposed to lie in substantially the same plane, wherein the plane is oriented generally parallel with respect to said longitudinal axis of said vibration damper;

said first and second weld portions having been applied during the same welding process, said bracket means having been held in a welding jig, the welding jig having been tipped to effect a transition between application of said first weld portion and application of said second weld portion;

said bracket means further comprises brake hose bracket means for accommodating at least one brake hose;

said brake hose bracket means being integral with said bracket means and extending downwardly generally from said back portion of said component;

said brake hose bracket having:
- a pair of longitudinal portions each being disposed about a portion of the circumference of said outer tube and each extending over an axial portion of said outer tube; and
- a pair of hose-accommodating portions, each of said pair of hose-accommodating portions extending radially outwardly from a corresponding one of said longitudinal portions and in a plane generally perpendicular to said longitudinal axis of said vibration damper, each of said pair of hose-accommodating portions having means for accommodating a brake hose;

said back portion of said bracket means being welded to said outer tube;

said one of said side portions of said component having a second edge portion, said second edge portion being disposed generally parallel to said longitudinal axis;

said one of said side portions of said guide plate means having an external surface disposed opposite and parallel to said internal surface, and facing away from said bracket means;

said bracket means further comprising a third weld portion being disposed to directly connect said second edge portion of said component with said external surface of said one of said side portions of said guide plate means;

said front portion of said component having a third edge portion being disposed generally parallel to said longitudinal axis, said third edge portion being disposed substantially directly against, and parallel to, said internal surface of said one of said side portions of said guide plate means;

said second edge portion having a width dimension defined parallel to a thickness of said one of said side portions of said component, the width dimension being generally perpendicular to said external and internal surfaces of said one of said side portions of said guide plate means;

said third weld portion being a fillet weld;

said external surface and said second edge portion being disposed to define a second locus of placement, said second locus of placement being a locus of placement of said third weld portion;

said second edge portion being separated from said first edge portion so as to adequately provide said second locus of placement for said fillet weld constituted by said third weld portion;

said other of said side portions of said guide plate means having a fourth edge portion;

said other of said side portions of said component having a second internal surface facing towards said one of said side portions of said component;

said fourth edge portion, said outer surface, and said second internal surface all being oriented substantially parallel to one another and to said longitudinal axis of said vibration damper;

at least:
said other of said side portions of said guide plate means; and said front portion of said component; being disposed to define a third locus of placement, said third locus of placement being a locus of placement of said additional single weld;

said third locus of placement of said additional single weld being substantially linear and being oriented substantially parallel to said fourth edge portion, said outer surface and said second internal surface;

said additional single weld being a fillet weld;

said outer surface being separated from said fourth edge portion so as to adequately provide said third locus of placement for said fillet weld constituted by said additional single weld;

said additional single weld being disposed to directly connect said outer surface and said second internal surface with one another;

said additional single weld being a fourth weld portion;

said bracket means further comprises a fifth weld portion being disposed to connect said second upper edge portion of said guide plate means with said second internal surface of said component;

said fourth weld portion and said fifth weld portion being disposed to lie in substantially the same plane, wherein the plane is oriented generally parallel with respect to said longitudinal axis of said vibration damper;

said fourth and fifth weld portions having been applied during the same welding process, said bracket means having been held in a welding jig, the welding jig having been tipped effect a transition between application of said fourth weld portion and application of said fifth weld portion;

said other of said side portions of said component having a fifth edge portion, said fifth edge portion being disposed generally parallel to said longitudinal axis;

said other of said side portions of said guide plate means having a second external surface disposed opposite and parallel to said second internal surface, and facing away from said bracket means;

said bracket means further comprising a sixth weld portion being disposed to directly connect said fifth edge portion of said component with said second external surface of said other of said side portions of said guide plate means;

said front portion of said component having a sixth edge portion being disposed generally parallel to said longitudinal axis, said sixth edge portion being disposed substantially directly against, and parallel to, said second internal surface of said other of said side portions of said guide plate means;

said fifth edge portion having a width dimension defined parallel to a thickness of said other of said side portions of said component, the width dimension being generally perpendicular to said second external and second internal surfaces of said other of said side portions of said guide plate means;

said sixth weld portion being a fillet weld;

said second external surface and said fifth edge portion being disposed to define a fourth locus of placement, said fourth locus of placement being a locus of placement of said sixth weld portion; and said fifth edge portion being separated from said fourth edge portion so as to adequately provide said fourth locus of placement for said fillet weld constituted by said sixth weld portion.

Another concept of the invention relates to the vibration damper, wherein:

said pair of side portions of said component are both disposed between said side portions of said guide plate means, such that said side portions of said guide plate means flank said side portions of said component;

said single weld is disposed to directly connect said outer surface and said internal surface with one another;

said guide plate means and said component constitute two different components;

said guide plate means having:
  a first upper edge portion disposed along an upper edge of said one of said side portions of said guide plate means; and
  a second upper edge portion disposed along an upper edge of said other of said side portions of said guide plate means;

said single weld being a first weld portion;

said bracket means further comprises a second weld portion being disposed to connect said first upper edge portion of said guide plate means with said internal surface of said component;

said first weld portion and said second weld portion being disposed to lie in substantially the same plane, wherein the plane is oriented generally parallel with respect to said longitudinal axis of said vibration damper;

said first and second weld portions having been applied during the same welding process, said bracket means having been held in a welding jig, the welding jig having been tipped to effect a transition between application of said first weld portion and application of said second weld portion;

said bracket means further comprises brake hose bracket means for accommodating at least one brake hose;

said brake hose bracket means being integral with said bracket means and extending downwardly generally from said bottom portion of said component;

said brake hose bracket having:
  a pair of longitudinal portions each being disposed about a portion of the circumference of said outer tube and each extending over an axial portion of said outer tube; and
  a pair of hose-accommodating portions, each of said pair of hose-accommodating portions extending radially outwardly from a corresponding one of said longitudinal portions and in a plane generally perpendicular to said longitudinal axis of said vibration damper, each of said pair of hose-accommodating portions having means for accommodating a brake hose;

said back portion of said bracket means being welded to said outer tube;

said other of said side portions of said guide plate means having a second edge portion;

said other of said side portions of said component having a second internal surface facing towards said one of said side portions of said component;

said second edge portion, said outer surface, and said second internal surface all being oriented substantially parallel to one another and to said longitudinal axis of said vibration damper;

at least:
  said other of said side portions of said guide plate means; and
  said front portion of said component; being disposed to define a second locus of placement, said second locus of placement being a locus of placement of said additional single weld;

said second locus of placement of said additional single weld being substantially linear and being oriented substantially parallel to said second edge portion, said outer surface and said internal surface;

said additional single weld being a fillet weld;

said outer surface being separated from said second edge portion so as to adequately provide said second locus of placement for said fillet weld constituted by said additional single weld;

said additional single weld being disposed to directly connect said outer surface and said second internal surface with one another;

said additional single weld being a third weld portion;

said bracket means further comprises a fourth weld portion being disposed to connect said second upper edge portion of said guide plate means with said second internal surface of said component;

said third weld portion and said fourth weld portion being disposed to lie in substantially the same plane, wherein the plane is oriented generally parallel with respect to said longitudinal axis of said vibration damper; and said third and fourth weld portions having been applied during the same welding process, said bracket means having been held in a welding jig, the welding jig having been tipped to effect a transition between application of said third weld portion and application of said fourth weld portion.

Another concept of the invention relates to the vibration damper, wherein said bracket means is formed from a single component.

Yet another concept of the invention relates to the vibration damper, wherein:

said front portion of said component comprises:
  a first portion and a second portion;
  said first portion being integral with, and extending from, one of said side portions;
  said second portion being integral with, and extending from, the other of said side portions; and said single weld being disposed to directly connect and to fasten said first and second portions of said front portion with each other.

Yet another concept of the invention relates to the vibration damper, wherein:

said first portion of said front portion has a first edge portion;

said second portion of said front portion has a second edge portion;

said first and second edge portions are disposed generally parallel to said longitudinal axis;

said first and second edge portions-are disposed to define a locus of placement of said single weld;

said locus of placement of said single weld is substantially linear and is oriented substantially parallel to said first edge portion and said second edge portion; and said single weld directly connects said first and second edge portions with one another.

A further concept of the invention relates to the vibration damper, further comprising:

said single weld being a first weld portion; said bottom portion comprising:
a first portion and a second portion;
said first portion being integral with, and extending from, said one of said side portions;
said second portion being integral with, and extending from, said other of said side portions;
said bracket means further comprises a second weld portion for directly connecting said first and second portions of said bottom portion;
said first portion of said bottom portion has a first edge portion;
said second portion of said bottom portion has a second edge portion;
said first and second edge portions of said bottom portion are disposed generally parallel to one another and are substantially coplanar with respect to said first and second edge portions of said front portion;
said first and second edge portions of said bottom portion are disposed to define a second locus of placement, said second locus of placement being a locus of placement for said second weld portion;
said second locus of placement of said single weld is substantially linear and is substantially coplanar with respect to said locus of placement of said single weld;
said second weld portion directly connects said first and second edge portions of said bottom portion with one another;
said first weld portion and said second weld portion being disposed to lie in substantially the same plane, said first weld portion and said second weld portion being disposed to lie wherein a plane which runs through said longitudinal axis of said vibration damper and represents a plane of symmetry of said bracket means;
said first and second weld portions each being weld seams;
said first and second weld portions having been applied during the same welding process, said bracket means having been held in a welding jig, the welding jig having been tipped to effect a transition between application of said first weld portion and application of said second weld portion;
said bracket means further comprises brake hose bracket means for accommodating at least one brake hose;
said brake hose bracket means being integral with said bracket means and extending downwardly generally from said back portion of said component; and
said brake hose bracket having:
a pair of longitudinal portions each being disposed about a portion of the circumference of said outer tube and each extending over an axial portion of said outer tube; and
a pair of hose-accommodating portions, each of said pair of hose-accommodating portions being disposed to extend radially outwardly from a corresponding one of said longitudinal portions and being disposed in a plane generally perpendicular to said longitudinal axis of said vibration damper, each of said pair of hose-accommodating portions having means for accommodating a brake hose.

Yet another concept of the invention relates to a method of making a vibration damper, such as a MacPherson strut, the vibration damper comprising: a first end and a second end; an outer tube disposed between the first end and the second end; the first end comprising means for connecting the vibration damper to a first body; the second end comprising means for connecting the vibration damper to a second body; the outer tube having an external surface; the outer tube defining a circumference at the external surface; a chamber defined within the outer tube; the chamber containing a damping fluid; a piston rod sealingly projecting into the chamber and being axially displaceable with respect to the outer tube; a piston attached to the piston rod, the piston being disposed within the chamber to sealingly divide the chamber into first and second chambers; means for permitting fluid communication between the first and second chambers; the vibration damper defining a central longitudinal axis, the central longitudinal axis defining an axial direction of the vibration damper; said method comprising the steps of:

configuring the vibration damper to comprise a first end and a second end;
providing an outer tube and disposing the outer tube between the first end and:the second end;
configuring the first end to comprise means for connecting the vibration damper to a first body;
configuring the second end to comprise means for connecting the vibration damper to a second body;
configuring the outer tube to have an external surface, the outer tube defining a circumference at the external surface;
defining a chamber within the outer tube;
disposing a damping fluid in the chamber;
providing a piston rod and sealingly projecting the piston rod into the chamber;
configuring the piston rod to be being axially displaceable with respect to the outer tube;
providing a piston and attaching the piston to the piston rod;
disposing the piston within the chamber to sealingly divide the chamber into first and second chambers;
providing means for permitting fluid communication between the first and second chambers;
configuring the vibration damper to define a central longitudinal axis, the central longitudinal axis defining an axial direction of the vibration damper;
providing bracket means, and mounting the bracket means to extend outwardly from the outer tube in a generally radial direction with respect to the longitudinal axis;
configuring the bracket means to have means for limiting axial displacement of at least a portion of the vibration damper, the means for limiting axial displacement comprising means for striking an external object to cease axial displacement of the at least a portion of the vibration damper;
said step of providing said bracket means comprising the steps of:
providing a back portion and disposing the back portion adjacent the external surface of the outer tube, the back portion extending over a portion of the circumference of the outer tube;
providing a pair of side portions and disposing the pair of side portions to extend radially outwardly from the external surface of the outer tube;
disposing the pair of side portions such that each of the pair of side portions is spaced apart from one another;

providing a front portion and disposing the front portion to extend between the pair of side portions, the front portion being spaced apart from the back portion;

providing a single weld for simultaneously and operatively connecting a portion of the front portion with:

the back portion; and at least one of the side portions; and simultaneously and operatively connecting the portion of the front portion with:

the back portion; and at least one of the side portions; with the single weld.

Examples of MacPherson struts, which may be utilized in accordance with the embodiments of the present invention, may be found in the following U.S. Pat. No. 4,944,524 (Jul. 31, 1990); and U.S. Pat. No. 4,477,061 (Oct. 16 1984), Examples of automatic welding arrangements, which may be utilized in accordance with the embodiments of the present invention, may be found in the following U.S. Pat. No. 4,377,024, which issued to Saperstein on Mar. 22, 1983; U.S. Pat. No. 4,229,641, which issued to Ihara on Oct. 21, 1980 U.S. Pat. No. 4,213,555, which issued to Minkiewicz et al. on Jul. 22, 1980; U.S. Pat. No. 4,112,289, which issued to Mead et al. on Sep. 5, 1978; and U.S. Pat. No. 3,964,665, which issued to Cervenka et al. on Jun. 22, 1976.

Examples of jig arrangements for automatic welding, which may be utilized in accordance with the embodiments of the present invention, may be found in the following U.S. Pat. No. 4,667,866, which issued to Tobita et al, on May 26, 1987, U.S. Pat. No. 4,593,850, which issued to Ariga et al. on Jun. 10, 1986 and U.S. Pat. No. 4,400,607, which issued to Wakou et al. on Aug. 23, 1983.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, published patent applications and publications recited herein, and in the Declaration attached hereto, are hereby incorporated by reference as if set forth in their entirety herein. The corresponding foreign patent publication applications, namely, Federal Republic of Germany Patent Application No. P 43 21 036.8, filed on Jun. 24, 1993, having inventors Günther Handke and Andreas Zietsch, and DE-OS P 43 21 036.8 and DE-PS P 43 21 036.8, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, published patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper comprising:

a first end and a second end;

an outer tube disposed between said first end and said second end;

said first end comprising means for connecting said vibration damper to a first body;

said second end comprising means for connecting said vibration damper to a second body;

said outer tube having an external surface;

said outer tube defining a circumference at said external surface;

a chamber defined within said outer tube;

said chamber containing a damping fluid;

a piston rod sealingly projecting into said chamber and being axially displaceable with respect to said outer tube;

a piston attached to said piston rod, said piston being disposed within said chamber to sealingly divide said chamber into first and second chambers;

means for permitting fluid communication between said first end second chambers;

said vibration damper defining a central longitudinal axis, the central longitudinal axis defining an axial direction of said vibration damper;

bracket means extending outwardly from said outer tube in a generally radial direction with respect to said longitudinal axis;

said bracket means having means for limiting axial displacement of at leas a portion of said vibration damper;

said means for limiting axial displacement comprising means for striking an external object to cease axial displacement of said at least a portion of said vibration damper;

said bracket means comprising:

a back portion disposed adjacent said external surface of said outer tube, said back portion extending over a portion of the circumference of said outer tube;

a pair of side portions extending radially outwardly from said external surface of said outer tube;

each of said pair of side portions being spaced apart from one another;

a front portion extending between said pair of side portions, said front portion being spaced apart from said back portion;

a single weld simultaneously and operatively connecting a portion of said front portion with:

said back portion; and at least one of said side portions; to hold said portion of said front portion, said back portion and said at least one of said side portions in position with respect to one another;

said bracket means being configured to accept a load along a predetermined direction upon the striking of an external object to stop axial displacement of said at least a portion of said vibration damper; and at least a substantial portion of said single weld being disposed to run in the direction of the load on the bracket means.

2. The vibration damper according to claim 1, wherein said single weld comprises a continuous weld seam being disposed to run in the direction of the load on said bracket means.

3. The vibration damper according to claim 2, wherein:

each of said side portions comprises a lower region;

said bracket means further comprises a bottom portion extending between said lower regions of said side portions; and said bottom portion comprises said means for striking an external object to cease axial displacement of said at least a portion of said vibration damper.

4. The vibration damper according to claim 3, wherein said bracket means is formed from a single component.

5. The vibration damper according to claim 4, wherein:

said front portion of said bracket means comprises a reinforcement plate;

said bottom portion of said bracket means comprises a base plate;

said side portions respectively comprise side walls of said bracket means;

said back portion comprises a guide plate;

said side walls comprise integral extensions of said guide plate and extend away from said guide plate and said longitudinal axis of said cylinder;

said reinforcement plate comprises:
  a first constituent portion and a second constituent portion;
  said first constituent portion of said reinforcement plate being integral with, and extending from, one of said side walls;
  said second constituent portion of said reinforcement plate being integral with, and extending from, the other of said side walls; and said single weld being disposed to directly connect and fasten said first and second constituent portions of said reinforcement plate with each other, to thus hold said reinforcement plate, said side walls and said guide plate in position with respect to one another.

6. The vibration damper according to claim 5, wherein said bracket means is formed from a single bent component.

7. The vibration damper according to claim 6, wherein:

said first constituent portion of said reinforcement plate includes a first edge;

said second constituent portion of said reinforcement plate includes a second edge, said first and second edges being disposed to face one another;

said first and second edges are disposed generally parallel to said longitudinal axis;

said first and second edges are disposed to define a region of placement of said single weld;

said region of placement of said single weld is substantially linear and is oriented substantially parallel to said first edge and said second edge; and said single weld directly connects said first and second edges with one another, to directly connect and fasten said first and second constituent portions of said reinforcement plate with one another.

8. The vibration damper according to claim 7, wherein:

said single weld comprises a continuous linear weld seam that directly connects said first and second edges with one another, to directly connect and fasten said first and second constituent portions of said reinforcement plate with one another.

9. The vibration damper according to claim 8, wherein:

said base plate comprises:
  a first constituent portion and a second constituent portion;
  said first constituent portion being integral with, and extending from, said one of said side walls;
  said second constituent portion being integral with, and extending from, said other of said side walls;

said bracket means further comprises an additional weld portion, said additional weld portion directly connecting said first and second constituent portions of said base plate with one another;

said first constituent portion of said base plate includes a third edge;

said second constituent portion of said base portion includes a fourth edge, said third and fourth edges being disposed to face one another;

said third and fourth edges are disposed generally parallel to said longitudinal axis;

said third and fourth edges are disposed to define a region of placement of said additional weld portion;

said region of placement of said additional weld portion is substantially linear and is oriented substantially parallel to said third edge and said fourth edge; and said additional weld portion comprises a continuous linear weld seam that directly connects said third and fourth edges with one another, to directly connect and fasten said first and second constituent portions of said base plate with one another.

10. The vibration damper according to claim 9, wherein said single weld and said additional weld portion are disposed to lie in substantially the same plane.

11. The vibration damper according to claim 10, wherein:

said single weld and said additional weld portion are disposed to lie in a plane that runs through said longitudinal axis of said vibration damper and represents a plane of symmetry of said bracket means;

said single weld and said additional weld portion are formed from a single weld application on said bracket means, the single weld application originating from a continuous weld that was applied to said bracket means while said bracket means was held in a welding jig and while the welding jig was tipped to effect a transition between application of said single weld and application of said additional weld portion;

said first and second constituent portions of said reinforcement plate constitute first and second halves of said reinforcement plate;

said first and second constituent portions of said base plate constitute first and second halves of said base plate;

said bracket means further comprises a brake hose bracket for accommodating at least one brake hose;

said brake hose bracket being integral with said bracket means and extending downwardly generally from said guide plate;

said brake hose bracket having:
  a pair of longitudinal portions each being disposed about a portion of the circumference of said outer tube and each extending over an axial portion of said outer tube; and
  a pair of hose-accommodating portions, each of said pair of hose-accommodating portions being disposed to extend radially outwardly from a corresponding one of said longitudinal portions and being disposed in a plane generally perpendicular to said longitudinal axis of said vibration damper, each of said pair of hose-accommodating portions having means for accommodating a brake hose;

said single bent component has been formed from a single sheet of material having been bent to form: said brake hose bracket, said side walls, said guide plate, said first and second constituent portions of said reinforcement plate, said first and second constituent portions of said base plate; and said guide plate is welded to said outer tube of said vibration damper.

12. A method of making a MacPherson strut comprising: a first end and a second end; an outer tube disposed between the first end and the second end; the first end comprising means for connecting the vibration damper to a first body; the second end comprising means for connecting the vibration damper to a second body; the outer tube having an external surface; the outer tube defining a circumference at the external surface; a chamber defined within the outer tube; the chamber containing a damping fluid; a piston rod sealingly projecting into the chamber and being axially displaceable with respect to the outer tube; a piston attached to the piston rod, the piston being disposed within the chamber to sealingly divide the chamber into first and second chambers; means for permitting fluid communication between the first and second chambers; the vibration damper defining a central longitudinal axis, the central longitudinal axis defining an axial direction of the vibration damper; said method comprising the steps of:

configuring the vibration damper to comprise a first end and a second end;

providing an outer tube and disposing the outer tube between the first end and the second end;

configuring the first end to comprise means for connecting the vibration damper to a first body;

configuring the second end to comprise means for connecting the vibration damper to a second body;

configuring the outer tube to have an external surface, the outer tube defining a circumference at the external surface;

defining a chamber within the outer tube;

disposing a damping fluid in the chamber;

providing a piston rod and sealingly projecting the piston rod into the chamber;

configuring the piston rod to be being axially displaceable with respect to the outer tube;

providing a piston and attaching the piston to the piston rod;

disposing the piston within the chamber to sealingly divide the chamber into first end second chambers;

providing means for permitting fluid communication between the first and second chambers;

configuring the vibration damper to define a central longitudinal axis, the central longitudinal axis defining an axial direction of the vibration damper;

providing bracket means, and mounting the bracket means to extend outwardly from the outer tube in a generally radial direction with respect to the longitudinal axis;

configuring the bracket means to have means for limiting axial displacement of at least a portion of the vibration damper, the means for limiting axial displacement comprising means for striking an external object to cease axial displacement of the at least a portion of the vibration damper;

said step of providing said bracket means comprising the steps of:

providing a back portion and disposing the back portion adjacent the external surface of the outer tube, the back portion extending over a portion of the circumference of the outer tube;

providing a pair of side portions and disposing the pair of side portions to extend radially outwardly from the external surface of the outer tube;

disposing the pair of side portions such that each of the pair of side portions is spaced apart from one another;

providing a front portion and disposing the front portion to extend between the pair of side portions, the front portion being spaced apart from the back portion;

providing a single weld that simultaneously and operatively connects a portion of the front portion with: the back portion; and at least one of the side portions to hold the portion of the front portion, the back portion and the at least one of the side portions in position with respect to one another.

13. The method according to claim 12, wherein:

each of said side portions comprises a lower region; and said providing of said bracket means further comprises the step of providing a bottom portion extending between said lower regions of said side portions, said bottom portion comprising said means for striking an external object to cease axial displacement of said at least a portion of said vibration damper.

14. The method according to claim 13, wherein said bracket means is formed from a single component.

15. The method according to claim 14, wherein:

said front portion of said bracket means comprises a reinforcement plate;

said bottom portion of said bracket means comprises a base plate;

said side portions respectively comprise side walls of said bracket means;

said back portion comprises a guide plate;

said side walls comprise integral extensions of said guide plate and extend away from said guide plate and said longitudinal axis of said cylinder;

said reinforcement plate comprises:
a first constituent portion and a second constituent portion;
said first constituent portion of said reinforcement plate being integral with, and extending from, one of said side walls;
said second constituent portion of said reinforcement plate being integral with, and extending from, the other of said side walls; and said step of simultaneously and operatively connecting with the single weld comprises the step of applying the single weld in a manner to directly connect and fasten said first and second constituent portions of said reinforcement plate with each other, to thus hold said reinforcement plate, said side walls and said guide plate in position with respect to one another.

16. The method according to claim 15, wherein said bracket means is formed by bending a single sheet of material into a single bent component.

17. The method according to claim 16, wherein:

said first constituent portion of said reinforcement plate includes a first edge;

said second constituent portion of said reinforcement plate includes a second edge, said first and second edges being disposed to face one another;

said first and second edges are disposed generally parallel to said longitudinal axis;

said first and second edges are disposed to define a region of placement of said single weld;

said region of placement of said single weld is substantially linear and is oriented substantially parallel to said first edge and said second edge;

said single weld directly connects said first and second edges with one another, to directly connect and fasten said first and second constituent portions of said reinforcement plate with one another;

said single weld is applied as a continuous linear weld seam that directly connects said first and second edges with one another, to directly connect and fasten said first and second constituent portions o said reinforcement plate with one another;

said base plate comprises:
 a first constituent portion and a second constituent portion;
 said first constituent portion being integral with, and extending from, said one of said side walls;
 said second constituent portion being integral with, and extending from, said other of said side walls;

said method further comprises the step of providing an additional weld portion that directly connects said first and second constituent portions of said base plate with one another;

said first constituent portion of said base plate includes a third edge;

said second constituent portion of said base portion includes a fourth edge, said third and fourth edges being disposed to face one another;

said third and fourth edges are disposed generally parallel to said longitudinal axis;

said third and fourth edges are disposed to define a region of placement of said additional weld portion;

said region of placement of said additional weld portion is substantially linear and is oriented substantially parallel to said third edge and said fourth edge; and said additional weld portion is applied as a continuous linear weld seam that directly connects said third and fourth edges with one another, to directly connect and fasten said first and second constituent portions of said base plate with one another.

18. The method according to claim 17, wherein:

said single weld and said additional weld portion ere applied:
 in such a manner that they lie in a single plane that runs through said longitudinal axis of said vibration damper and represents a plane of symmetry of said bracket means; and
 in a single, continuous weld application.

19. The method according claim 18, wherein:

the single, continuous weld application is applied to said bracket means while said bracket means is held in a welding jig and while he welding jig is tipped to effect a transition between the application of said single weld and the application of said additional weld portion;

said first and second constituent portions of said reinforcement plate constitute first and second halves of said reinforcement plate;

said first and second constituent portions of said base plate constitute first and second halves of said reinforcement plate;

said bracket means further comprises a brake hose bracket for accommodating at least one brake hose;

said brake hose bracket being integral with said bracket means and extending downwardly generally from said guide plate;

said brake hose bracket having:
 a pair of longitudinal portions each being disposed about a portion of the circumference of said outer tube and each extending over an axial portion of said outer tube; and
 a pair of hose-accommodating portions, each of said pair of hose-accommodating portions being disposed to extend radially outwardly from a corresponding one of said longitudinal portions and being disposed in a plane generally perpendicular to said longitudinal axis of said vibration damper, each of said pair of hose-accommodating portions having means for accommodating a brake hose;

the bending of a single sheet of material, to form said single bent component, forms all of: said brake hose bracket, said side walls, said guide plate, said first and second constituent portions of said reinforcement plate, said first and second constituent portions of said base plate; and said method further comprises the step of welding said guide plate to said outer tube of said vibration damper.

20. A vibration damper in a suspension system comprising:

a first end and a second end;

an outer tube disposed between said first end and said second end;

said first end comprising means for connecting said vibration damper to a first body;

said second end comprising means for connecting said vibration damper to a second body;

said outer tube having an external surface;

said outer tube defining a circumference at said external surface;

a chamber defined within said outer tube;

said chamber containing a damping fluid;

a piston rod sealingly projecting into said chamber and being axially displaceable with respect to said outer tube;

a piston attached to said piston rod, said piston being disposed within said chamber to sealingly divide said chamber into first and second chambers;

means for permitting fluid communication between said first and second chambers;

said vibration damper defining a central longitudinal axis, the central longitudinal axis defining an axial direction of said vibration damper;

bracket means extending outwardly from said outer tube in a generally radial direction with respect to said longitudinal axis;

said bracket means having means for limiting axial displacement of at least a portion of said vibration damper;

said means for limiting axial displacement comprising means for striking an external object to cease axial displacement of said at least a portion of said vibration damper;

said bracket means comprising:
 a back portion disposed adjacent said external surface of said outer tube, said back portion extending over a portion of the circumference of said outer tube;
 a pair of side portions extending radially outwardly from said external surface of said outer tube;
 each of said pair of side portions being spaced apart from one another;
 a front portion extending between said pair of side portions, said front portion being spaced apart from said back portion;
 a single weld simultaneously and operatively connecting a portion of said front portion with:

said back portion; and at least one of said side portions; to hold said portion of said front portion, said back portion and said at least one of said side portions in position with respect to one another;

a support surface disposed on said suspension system, said support surface being disposed to be struck by said bracket means during travel of said vibration damper in said suspension system;

said bracket means being disposed and configured to accept a load along a predetermined direction upon the striking of said support surface to stop axial displacement of said at least a portion of said vibration damper; and at least a substantial portion of said single weld being disposed to run in the direction of the load accepted from said support surface on the bracket means.

21. The vibration damper according to claim 3 wherein said bracket means comprises:

a guide plate having a back portion and a pair of side portions;

said back portion of said guide plate comprising said back portion of said bracket means and being welded to said outer tube;

said side portions of said guide plate extending radially outwardly from said back portion of said guide plate and being spaced-apart from one another;

a base plate comprising a bottom portion and a pair of side portions, said bottom portion of said base plate comprising said bottom portion of said bracket means;

said bottom portion of said base plate extending between said side portions of said base plate;

said side portions of said base plate being spaced-apart from one another; and each of said side portions of said bracket means comprises:
one of said side portions of said guide plate; and
one of said side portions of said base plate.

22. The vibration damper according to claim 21, wherein:

said front portion of said bracket means comprises a reinforcement plate extending between said side portions of said bracket means;

said single weld being disposed to directly connect a part of each of:
one of said side portions of said guide plate; one of said side portions of said base plate; and said reinforcement plate; with one another.

23. The vibration damper according to claim 21 wherein:

said base plate comprises a front portion extending between said side portions of said bracket means, said front portion of said base plate comprising said front portion of said bracket means;

said single weld being disposed to operatively connect a part of each of:
one of said side portions of said guide plate;
one of said side portions of said base plate; and said front portion of said base plate; with one another.

24. The vibration damper according to claim 23 wherein:

said front portion of said base plate comprises a reinforcement plate; and said base plate and said reinforcement plate comprise a single component different from said guide plate.

* * * * *